(12) United States Patent
Hirabayashi

(10) Patent No.: US 11,584,042 B2
(45) Date of Patent: Feb. 21, 2023

(54) COMPOSITE MATERIAL FORMING JIG, COMPOSITE MATERIAL FORMING METHOD AND COMPOSITE MATERIAL

(71) Applicant: SUBARU CORPORATION, Tokyo (JP)

(72) Inventor: Daisuke Hirabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 354 days.

(21) Appl. No.: 16/665,088

(22) Filed: Oct. 28, 2019

(65) Prior Publication Data

US 2020/0055266 A1 Feb. 20, 2020

Related U.S. Application Data

(63) Continuation of application No. PCT/JP2018/014173, filed on Apr. 2, 2018.

(30) Foreign Application Priority Data

Apr. 28, 2017 (JP) .............................. JP2017-089546

(51) Int. Cl.
*B29C 33/26* (2006.01)
*B29C 43/04* (2006.01)
(Continued)

(52) U.S. Cl.
CPC .............. *B29C 33/26* (2013.01); *B29C 43/04* (2013.01); *B29C 43/12* (2013.01);
(Continued)

(58) Field of Classification Search
CPC ....... B29C 70/446; B29C 43/04; B29C 43/12; B29C 43/3607; B29C 43/42; B29C 2043/043
See application file for complete search history.

(56) References Cited

U.S. PATENT DOCUMENTS 9,566,739 B2 2/2017 Chapman et al.
2009/0065977 A1 3/2009 Suzuki et al.
(Continued)

FOREIGN PATENT DOCUMENTS

CN 105014987 A 11/2015
GB 2 244 453 A 12/1991
(Continued)

OTHER PUBLICATIONS

The First Office Action issued in corresponding Chinese Patent Application No. 201880024169.7 dated Apr. 21, 2021, with machine translation.

(Continued)

*Primary Examiner* — Galen H Hauth
(74) *Attorney, Agent, or Firm* — Troutman Pepper Hamilton Sanders LLP

(57) ABSTRACT

According to one implementation, a composite material forming jig includes molds and a tilting structure. The molds are developable for laminating fiber sheets, after or before impregnated with a resin, in a developed state where the molds are developed. At least one mold of the molds is capable of being inclined relatively to another mold of the molds so that the laminated fiber sheets are shaped. The tilting structure is adapted to develop the molds when the fiber sheets are laminated and incline the at least one mold when the laminated fiber sheets are shaped.

7 Claims, 13 Drawing Sheets

(51) Int. Cl.
   *B29C 43/12*     (2006.01)
   *B29C 43/36*     (2006.01)
   *B29C 43/42*     (2006.01)
   *B29C 70/44*     (2006.01)
   *B29C 70/46*     (2006.01)

(52) U.S. Cl.
   CPC .......... *B29C 43/3607* (2013.01); *B29C 43/42* (2013.01); *B29C 70/446* (2013.01); *B29C 70/461* (2021.05); *B29C 2043/043* (2013.01)

(56) References Cited

U.S. PATENT DOCUMENTS

| | | | |
|---|---|---|---|
| 2014/0117582 A1 | 5/2014 | Wilkerson et al. | |
| 2016/0332395 A1 | 11/2016 | Abe et al. | |
| 2017/0158252 A1* | 6/2017 | Milne | ........................ B32B 3/12 |
| 2018/0147796 A1* | 5/2018 | Marengo | ............... B29C 70/462 |
| 2020/0122383 A1* | 4/2020 | Egashira | ................... B32B 1/00 |

FOREIGN PATENT DOCUMENTS

| | | |
|---|---|---|
| JP | 40-107198 A | 5/1965 |
| JP | 2006-335049 A | 12/2006 |
| JP | 2010-115867 A | 5/2010 |
| JP | 2014-51065 A | 3/2014 |
| JP | 2015-142993 A | 8/2015 |
| JP | 2015-157481 A | 9/2015 |
| JP | 2015-229304 A | 12/2015 |
| WO | 2007/102573 A1 | 9/2007 |

OTHER PUBLICATIONS

Notice of Reasons for Refusal issued in corresponding Japanese Patent Application No. 2019/515188 dated Jun. 24, 2020, with machine translation.
Notification of Transmittal of Translation of the International Preliminary Report on Patentability (Chapter 1 or Chapter II) issued in corresponding International Patent Application No. PCT/JP2018/014173 dated Nov. 7, 2019.
International Search Report and Written Opinion issued in corresponding International Patent Application No. PCT/JP2018/14173 in Japanese only).
Supplementary European Search Report issued in corresponding European Patent Application No. 18 78 9888 dated Dec. 18, 2020.
Communication pursuant to Article 94(3) issued in European Patent Application No. 18 789 888 dated Nov. 24, 2021.
Second Office Action with Machine Translation dated Dec. 21, 2021 in Chinese Patent Application 201880024169.7; 15 pages.
Final Office Action with Machine Translation dated Apr. 13, 2022 in Chinese Patent Application 201880024169.7; 15 pages.

* cited by examiner

COMPOSITE MATERIAL FORMING JIG, COMPOSITE MATERIAL FORMING METHOD AND COMPOSITE MATERIAL

CROSS REFERENCES TO RELATED APPLICATIONS

This is a continuation of Application PCT/JP2018/14173, filed on Apr. 2, 2018.

This application is based upon and claims the benefit of priority from Japanese Patent Application No. 2017-089546 filed on Apr. 28, 2017; the entire contents of which are incorporated herein by reference.

FIELD

Implementations described herein relate generally to a composite material forming jig, a composite material forming method and a composite material.

BACKGROUND

A typical method of forming a composite material, such as GFRP (glass fiber reinforced plastics) or CFRP (carbon fiber reinforced plastics), includes laminating prepregs, each consisting of sheet like fibers impregnated with a resin, and subsequent thermal curing of the laminated prepregs with an autoclave apparatus or the like. Therefore, a forming jig for laminating sheet like prepregs according to a shape of a composite material after curing is used (for example, refer to Japanese Patent Application Publication JP2015-157481 A and Japanese Patent Application Publication JP2014-051065 A).

A work for giving a shape to prepregs before curing is called "shaping" in order to be distinguished from "molding" by thermal curing of prepregs. When prepregs are laminated on a mold for a composite material, it is important to laminate the prepregs so that wrinkles are not generated on the prepregs. Thus, a forming method of a composite material with moving a roller so as to prevent generation of wrinkles on prepregs laminated on a mold has been proposed (for example, refer to Japanese Patent Application Publication JP2006-335049 A).

In order to form a composite material having a complicated shape by laminating prepregs on a mold, the mold has to have a complicated shape. In addition, it is required to design the shape of the mold so as to remove the mold from a cured composite material, that is, release the cured composite material from the mold.

On the contrary, a composite material having a shape which is difficult to be released from a mold cannot be integrally molded with a mold. Therefore, a composite material having a complicated shape has to be separated into a plurality of parts so that the parts after thermal curing can be assembled with fasteners. Alternatively, laminated bodys of prepregs corresponding to the respective parts have to be assembled for co-curing. As another method of producing a composite material having a complicated shape, a method of setting a previously thermally-cured part on prepregs before curing so that the part can be co-bonded to the prepregs at the same time as curing the prepregs is also known.

As a concrete example, producing a composite material structure composed of a skin panel and reinforcement members, such as spars, ribs and stringers, attached on the skin panel, which is a typical aircraft structural object, requires producing the skin panel and the reinforcement members separately and assembling the skin panel and the reinforcement separately produced. Indeed, a skin panel and reinforcement members, such as spars, are heated and cured respectively, and subsequently, the skin panel and the reinforcement members are assembled with fasteners. Alternatively, a laminated body of prepregs for a skin panel and a laminated body of prepregs for each reinforcement member are produced separately, and subsequently, the assembled laminated bodies are heated and cured. In particular, producing a laminated body of prepregs for a spar requires a preliminary shaping process with a hot drape forming apparatus. Accordingly, time required for production is long and production cost becomes high.

Accordingly, an object of the present invention is to make it possible to easily mold a composite material having a complicated structure.

SUMMARY OF THE INVENTION

In general, according to one implementation, a composite material forming jig includes molds and a tilting structure. The molds are developable for laminating fiber sheets, after or before impregnated with a resin, in a developed state where the molds are developed. At least one mold of the molds is capable of being inclined relatively to another mold of the molds so that the laminated fiber sheets are shaped. The tilting structure is adapted to develop the molds when the fiber sheets are laminated and incline the at least one mold when the laminated fiber sheets are shaped.

Further, according to one implementation, a composite material forming method includes: setting molds, of which at least one mold is capable of being inclined relatively to another mold of the molds, in a developed state; laminating fiber sheets, after or before impregnated with a resin, on the molds in the developed state; shaping the laminated fiber sheets impregnated with the resin, by relatively inclining the at least one mold; and producing a product or a semi-product made of a composite material consisting of the cured resin reinforced with fibers included in the fiber sheets, by thermal curing of the shaped fiber sheets, impregnated with the resin, under a pressure.

Further, according to one implementation, a composite material includes a laminated body of fiber reinforced resin layers bent in a same direction at not less than four positions. The fiber reinforced resin layers consist of a cured resin reinforced with fibers.

DETAILED DESCRIPTION

A composite material forming jig, a composite material forming method and a composite material according to implementations of the present invention will be described with reference to the accompanying drawings.
(First Implementation)
(Composite Material Forming Jig)

Figure 1:
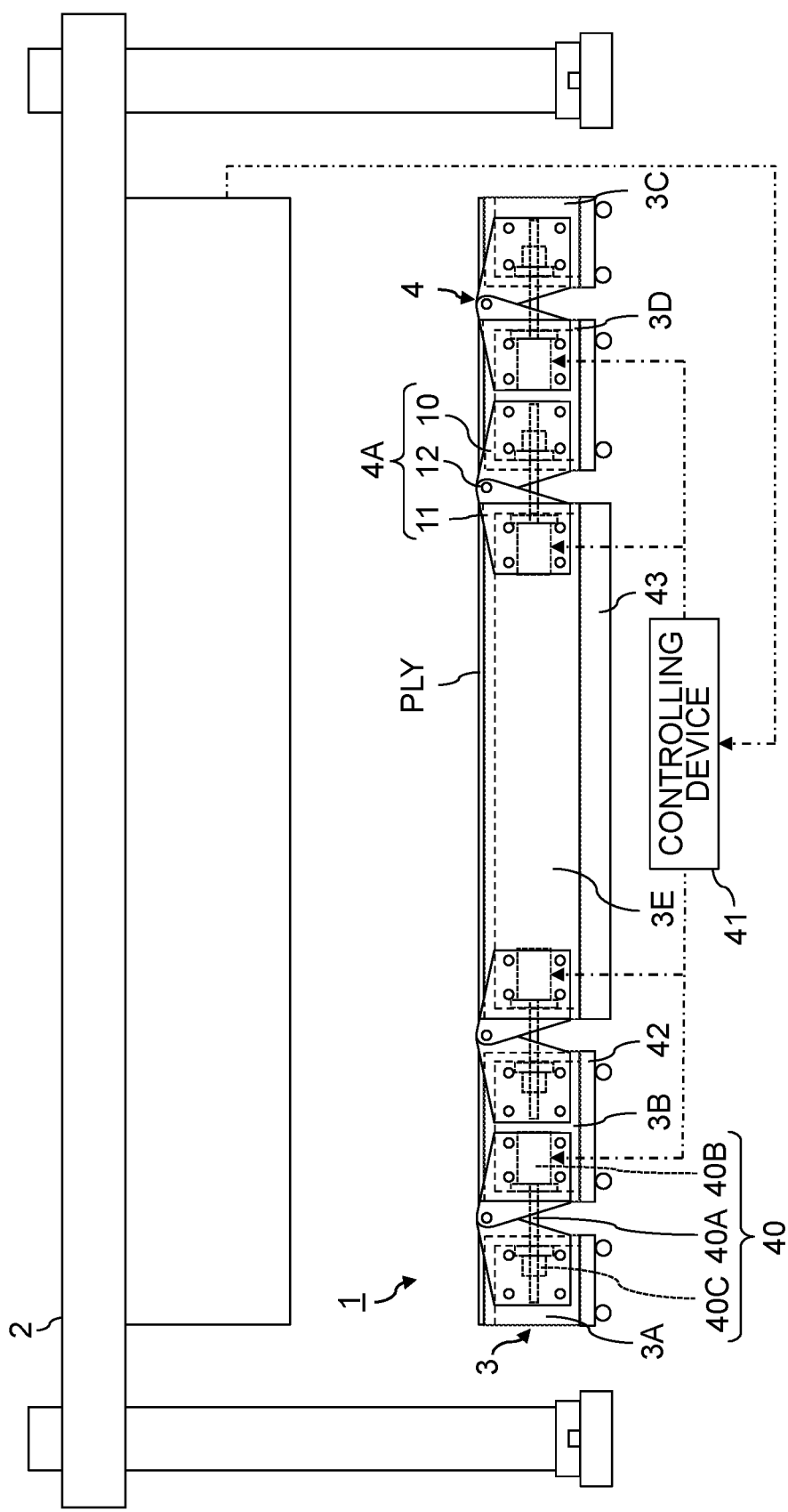
FIG. 1 is a front view showing a structure of a composite material forming jig, in a developed state, according to the first implementation of the present invention.
Figure 2:
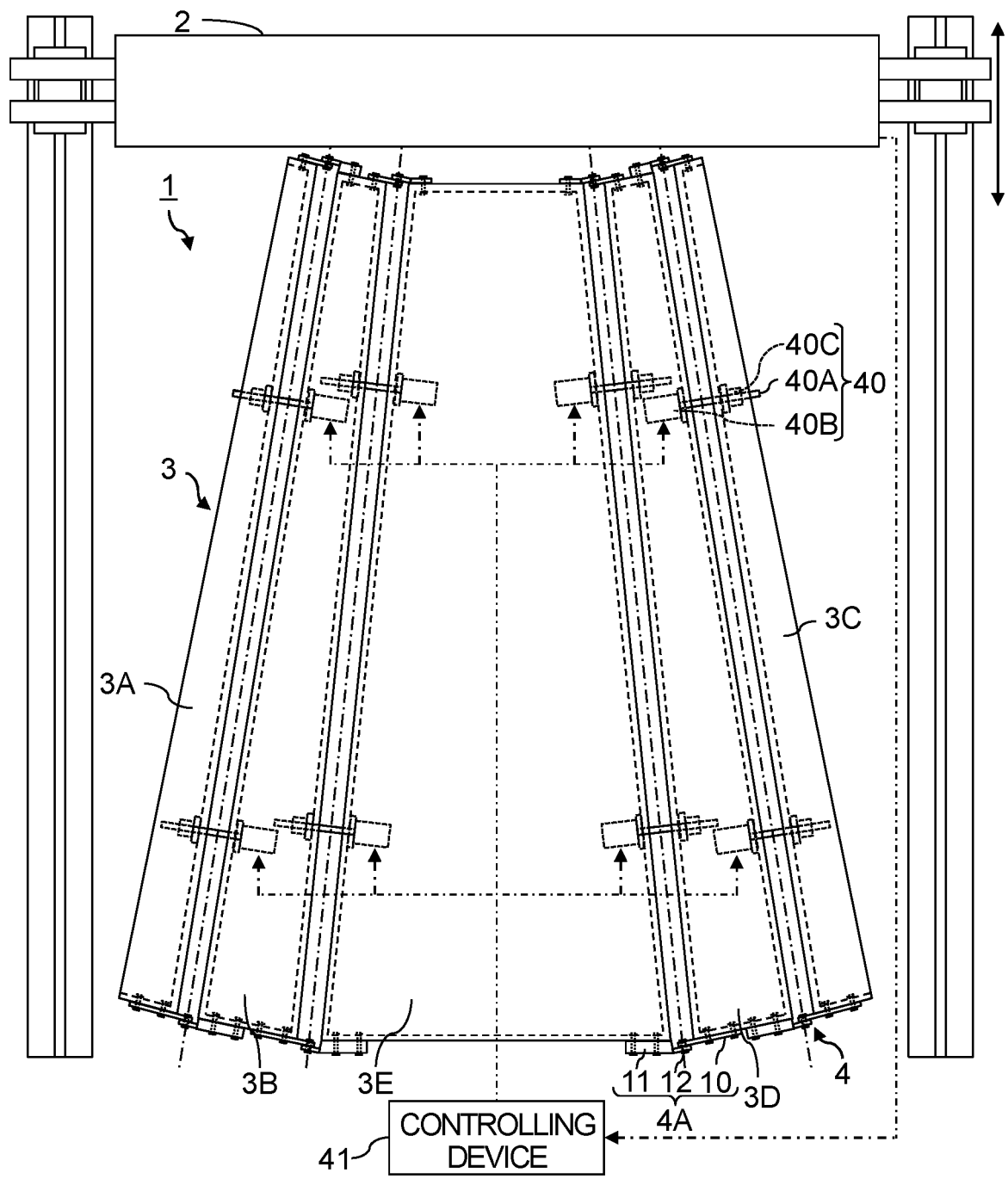
FIG. 2 is a top view of the composite material forming jig shown in FIG. 1.
Figure 3:
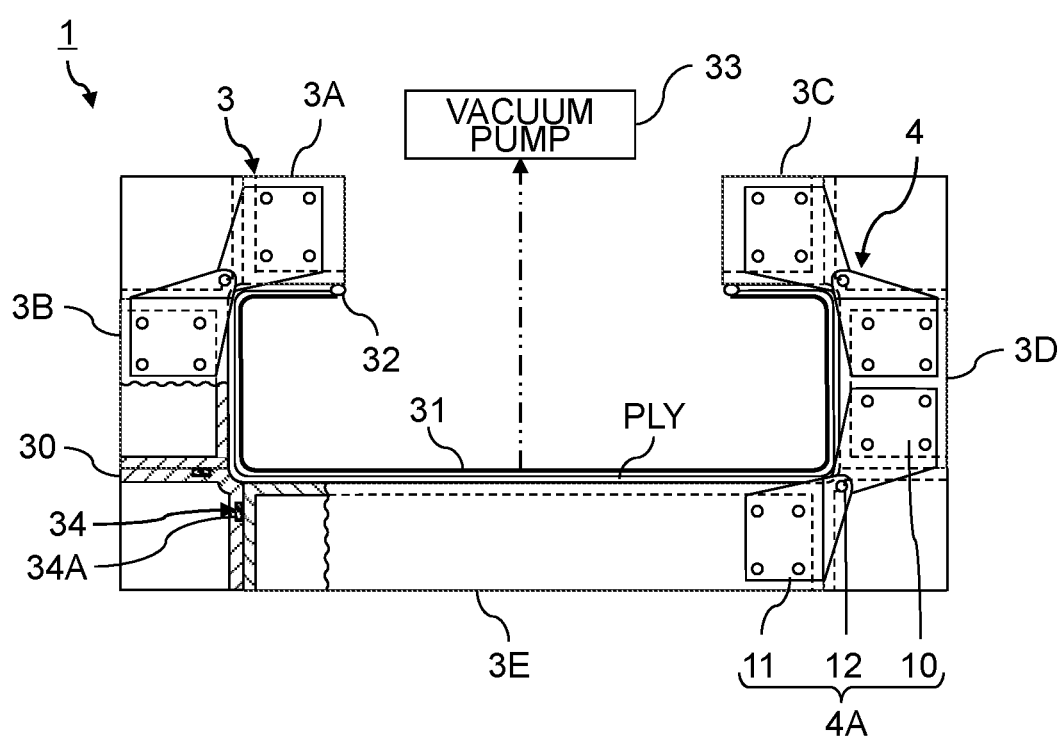
FIG. 3 is a front view of the composite material forming jig shown in FIG. 1 at the time of shaping.
Figure 4:
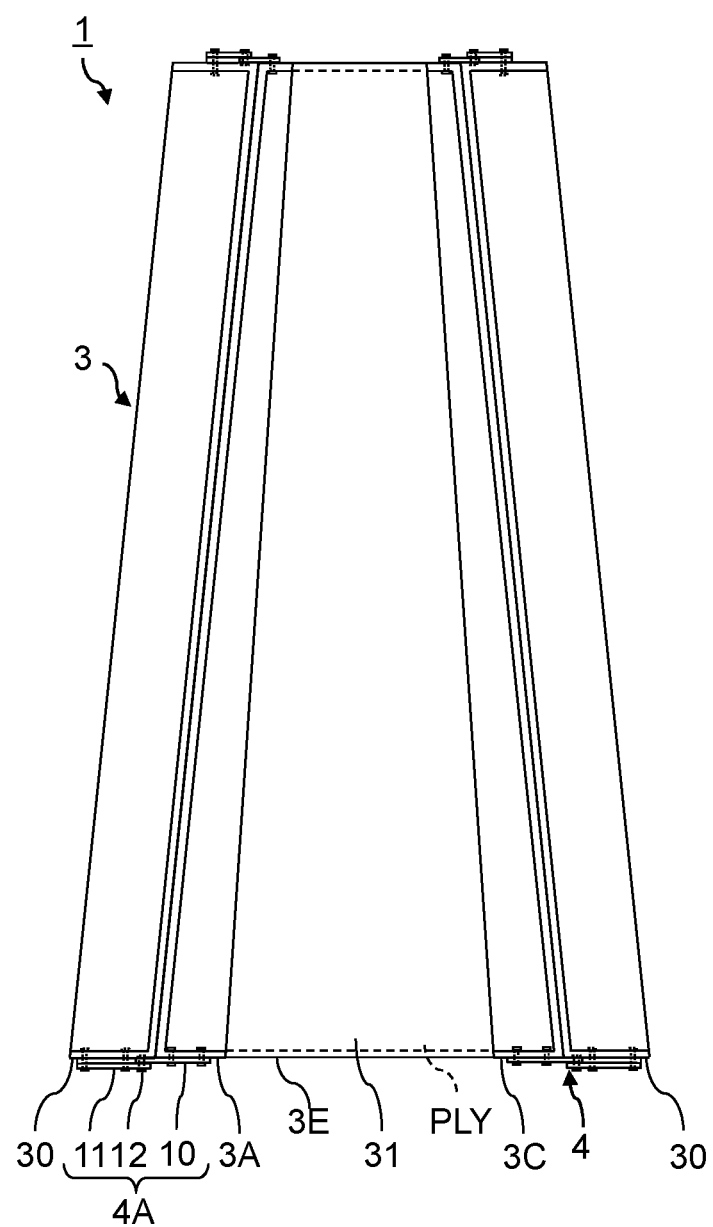
FIG. 4 is a top view of the composite material forming jig shown in FIG. 3.

FIG. 1 is a front view showing a structure of a composite material forming jig, in a developed state, according to the first implementation of the present invention. FIG. 2 is a top view of the composite material forming jig shown in FIG. 1. FIG. 3 is a front view of the composite material forming jig shown in FIG. 1 at the time of shaping. FIG. 4 is a top view of the composite material forming jig shown in FIG. 3.

A composite material forming jig 1 is a jig for laminating prepregs, each consisting of a sheet like fiber bundle impregnated with a thermosetting resin before curing, shaping the laminated prepregs and thermal curing of the laminated body of the prepregs.

Note that, a thermosetting resin may be impregnated after laminating sheet like fibers. In such a case, sheet like fibers are laminated with the composite material forming jig 1, instead of sheet like prepregs. In an example shown in FIG. 1, fiber reinforced resin layers PLY consisting of prepregs are laminated on the composite material forming jig 1. Meanwhile, a laminated body of fiber reinforced resin layers consisting of prepregs or a laminated body of fiber reinforced resin layers obtained by impregnating laminated fiber sheets with a thermosetting resin is shaped with the composite material forming jig 1, in an example shown in FIG. 3. Note that, drawing sheet like prepregs or sheet like fibers is omitted in FIG. 2.

A composite material forming method by impregnating fiber sheets with a resin after laminating the fiber sheets is called an RTM (Resin Transfer Molding) method. Among the RTM methods, a method of using a vacuum pressure for impregnating fiber sheets with a resin is called a VaRTM (Vacuum assisted Resin Transfer Molding) method.

Moreover, the composite material forming jig 1 may also be used for molding a composite material by a hybrid molding method which uses the RTM method in addition to laminating prepregs. The hybrid molding method is a method of molding a composite material by laminating fiber sheets on a laminated body of prepregs, impregnating the laminated fiber sheets with a resin, and performing thermal curing of the laminated body of prepregs and the laminated fiber sheets impregnated with the resin. Therefore, both prepreg sheets and fiber sheets are laminated when the composite material forming jig 1 is used for molding a composite material by the hybrid molding method.

As a method of thermal curing of a composite material, a desired method can be adopted. A typical method of thermal curing of a composite material is to carry the composite material before curing into an autoclave molding apparatus and perform the thermal curing with applying a pressure by vacuuming. Meanwhile, various OoA (Out of autoclave) molding methods for molding a composite material without any autoclave molding apparatus are known. As a concrete example, a method of using an oven for thermal curing of a composite material is known. Therefore, the composite material forming jig 1 on which a composite material before curing and after shaping has been set can be carried into desired equipment according to a thermal curing method of the composite material.

The composite material forming jig 1 can change a structure between a developed state and an assembled state as exemplified shown in FIG. 1 to FIG. 4. When prepregs or fiber sheets are laminated, the composite material forming jig 1 is set in the developed state as shown in FIG. 1 and FIG. 2. Meanwhile, the composite material forming jig 1 is set in the assembled state as shown in FIG. 3 and FIG. 4 at the time of shaping and thermal curing of fibers impregnated with a resin.

Therefore, at least one of fiber sheets impregnated with a resin, i.e., prepreg sheets, and fiber sheets before impregnated with the resin can be laminated on the composite material forming jig 1 in the developed state automatically with an automatic laminating device 2 or manually by hand work of a worker without the automatic laminating device 2. On the other hand, the composite material forming jig 1 can be bent to be assembled when laminating prepregs or fibers has been completed. Thus, a laminated body of fiber reinforced resin layers consisting of fibers impregnated with the resin before curing can be shaped according to a shape of the composite material after the curing.

For that purpose, the composite material forming jig 1 is composed of at least a plurality of molds 3 and a tilting structure 4. The molds 3 can be developed by the tilting structure 4 while at least one of the molds 3 can be inclined relatively to the other mold 3 or the other molds 3 by the tilting structure 4. Meanwhile, the tilting structure 4 has a structure which can incline at least one of the molds 3.

Each mold 3 is a jig for laminating fiber sheets impregnated with a resin and/or fiber sheets before impregnated with a resin, in the developed state. Therefore, each mold 3 has a flat surface or a curved surface, having a small curvature, for laminating prepregs or fiber sheets. That is, a lamination surfaces formed as a surface of each mold 3 may be not only a flat surface but also a curved surface so long as prepregs or fiber sheets can be laminated. Each mold 3 can be composed of a rigid body made of a metal, a composite material, such as CFRP, or the like. Each mold 3 can have a desired structure, such as a plate form structure, a block structure or a hollow box structure.

As exemplified in FIG. 1, the respective molds 3 are disposed so that the lamination surfaces of the molds 3 may be nearly flat when the respective molds 3 are developed. Therefore, sheet like prepregs or sheet like fibers can be laminated on the lamination surfaces of the molds 3 in the developed state, not only manually by a worker but automatically by the automatic laminating device 2 including a traveling structure, such as wheels or crawlers, as shown by the figures. Alternatively, the automatic laminating device 2 may be fixed while the molds 3 may be moved so that sheet like prepregs or fibers can be laminated.

At least one of the molds 3 can be inclined relatively to the other mold 3 or molds 3. Thereby, a laminated body of fiber reinforced resin layers, which is at least one of fiber reinforced resin layers consisting of prepregs and fiber reinforced resin layers obtained by impregnating laminated fiber sheets with a resin, can be shaped. After that, the shaped lamination body of the fiber reinforced resin layers can be heated and cured in the state where the shaped lamination body of the fiber reinforced resin layers has been set in the assembled molds 3. As a result, a composite material having a shape of the lamination body of the fiber reinforced resin layers after the shaping can be produced.

The tilting structure 4 is an implement or an instrument for developing the molds 3 when prepregs or fibers are laminated and inclining at least one of the molds 3 when a laminated boy of fiber reinforced resin layers is shaped.

For example, the tilting structure 4 can be composed of hinges 4A without power as shown in the figures. Specifically, at least one mold 3 to be inclined and the mold 3 adjacent to the mold 3 to be inclined can be rotatably coupled to each other with the hinges 4A. In this case, the mold 3 to be inclined can be inclined using general purpose equipment, such as a hoist or a forklift, without providing a large special device.

Alternatively, the tilting structure 4 may be a tilting device of the mold 3 using a power. For example, a motor for rotating the hinge 4A, which couples the molds 3 to each other, may be provided so that an automatic tilting device of the mold 3 can be configured. In this case, a plurality of the hinges 4A which couple the common molds 3 to each other may be coupled to each other with a rotating shaft in order to secure transmission of power and rigidity.

When at least one of inclination angles of the molds 3 to be inclined is constant in the state where the molds 3 have been assembled, at least one of the tilting structures 4 may have a structure for restricting the inclination angle. Specifically, the tilting structure 4 may have a stopper structure which restricts an inclination angle of the mold 3 to be inclined so that the inclination angle of the mold 3 to be inclined can be changed only between an inclination angle relative to the adjacent mold 3 in the developed state and an inclination angle relative to the adjacent mold 3 in the state where assembling the molds 3 has been completed.

Figure 5:
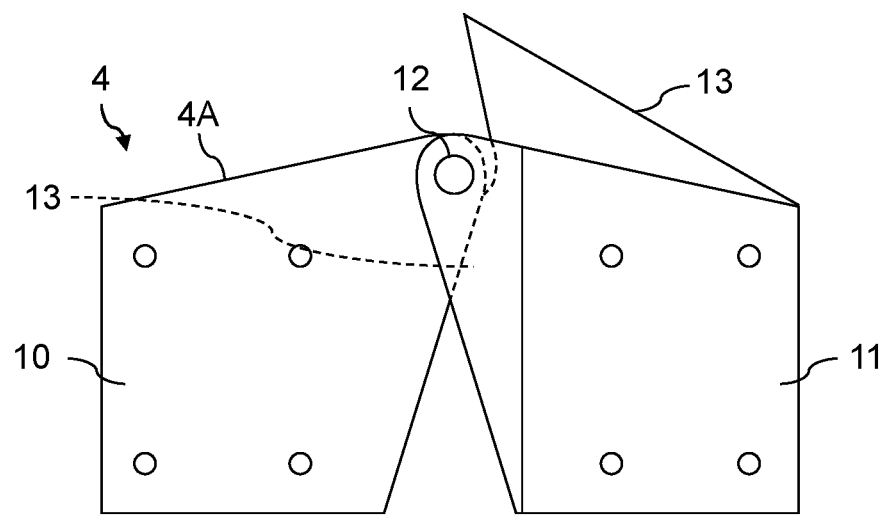
FIG. 5 shows an example where the hinge used as the tilting structure of the mold to be inclined has a stopper structure of an inclination angle.
Figure 6:
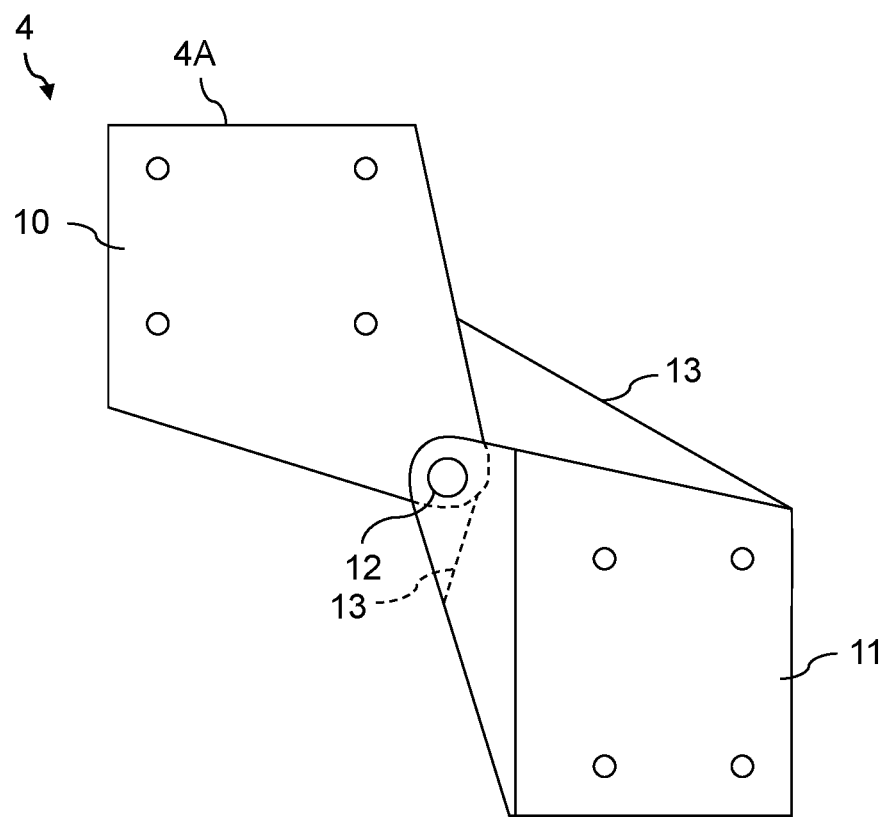
FIG. 6 shows a state where the hinge shown in FIG. 5 is moved in order to incline the mold to be inclined.

FIG. 5 shows an example where the hinge 4A used as the tilting structure 4 of the mold 3 to be inclined has a stopper structure of an inclination angle. FIG. 6 shows a state where the hinge 4A shown in FIG. 5 is moved in order to incline the mold 3 to be inclined.

When an inclination angle of the mold 3 to be inclined is 0° to the adjacent mold 3 in the developed state of the molds 3 while an inclination angle of the mold 3 to be inclined is 90° to the adjacent mold 3 in the state where the molds 3 have been assembled, the tilting structure 4 can be configured using the hinge 4A which can rotate one member relatively to the other member within a range of 0° to 90°, for example.

That is, a rotation range of the hinge 4A can be restricted within 0° to 90°. As a concrete example, the tilting structure 4 can be composed of the hinge 4A having two platy parts 10 and 11 coupled to each other with a rotating shaft 12 and disposed so that each of the thickness directions of the platy parts 10 and 11 becomes a rotation axis direction, i.e., so that at least one of the platy parts 10 and 11 can rotate around the rotating shaft 12, as exemplified in FIG. 5 and FIG. 6. In such a case, a stopper 13, which contacts with the rotating platy part 10, to restrict a rotation range of the rotating platy part 10 within 0° to 90° can be attached to the other platy part 11. Thereby, the mold 3 to be inclined can always be developed and inclined at appropriate inclination angles.

In addition, it is possible to dispose the molds 3 in different assembled states by inclining at least one of the molds 3 by different inclination angles, regardless of whether the tilting structure 4, such as the hinge 4A, has a stopper structure which restricts an inclination angle of the mold 3 to be inclined. In that case, it becomes possible to mold composite materials having different shapes using the common molds 3. As a concrete example, a plurality of kinds of stringers or the like whose inclination angles of flanges to a web are different from each other can be produced using the common molds 3.

When the composite material forming jig 1 is composed of the two molds 3 of which surfaces are generally flat and at least one of the two molds 3 can be inclined relatively to the other by the tilting structures 4, a composite material of which cross section is L-shaped, i.e., a laminated body of fiber reinforced resin layers after curing bent along a single line can be molded.

When the composite material forming jig 1 is composed of at least three molds 3 so that at least two out of the molds 3 can be inclined relatively to the others by the tilting structures 4, a female shaping jig having a concave for shaping a laminated body of fiber reinforced resin layers can be formed. Therefore, a composite material, of which cross section is U-shaped, C-shaped, channel shaped or O-shaped, and an angular cylindrical composite material can be formed.

Furthermore, a composite material produced by the composite material forming jig 1 has a seamless shape derived by bending a laminated body of fiber reinforced resin layers. For example, inclining not less than three molds 3 out of not less than four molds 3 relatively to the other molds 3 by the tilting structure 4 makes it possible to produce a composite material, in which cured resin has been reinforced with fibers, having a shape of a laminated body of fiber reinforced resin layers bent along not less than three lines in the same direction.

Figure 7:
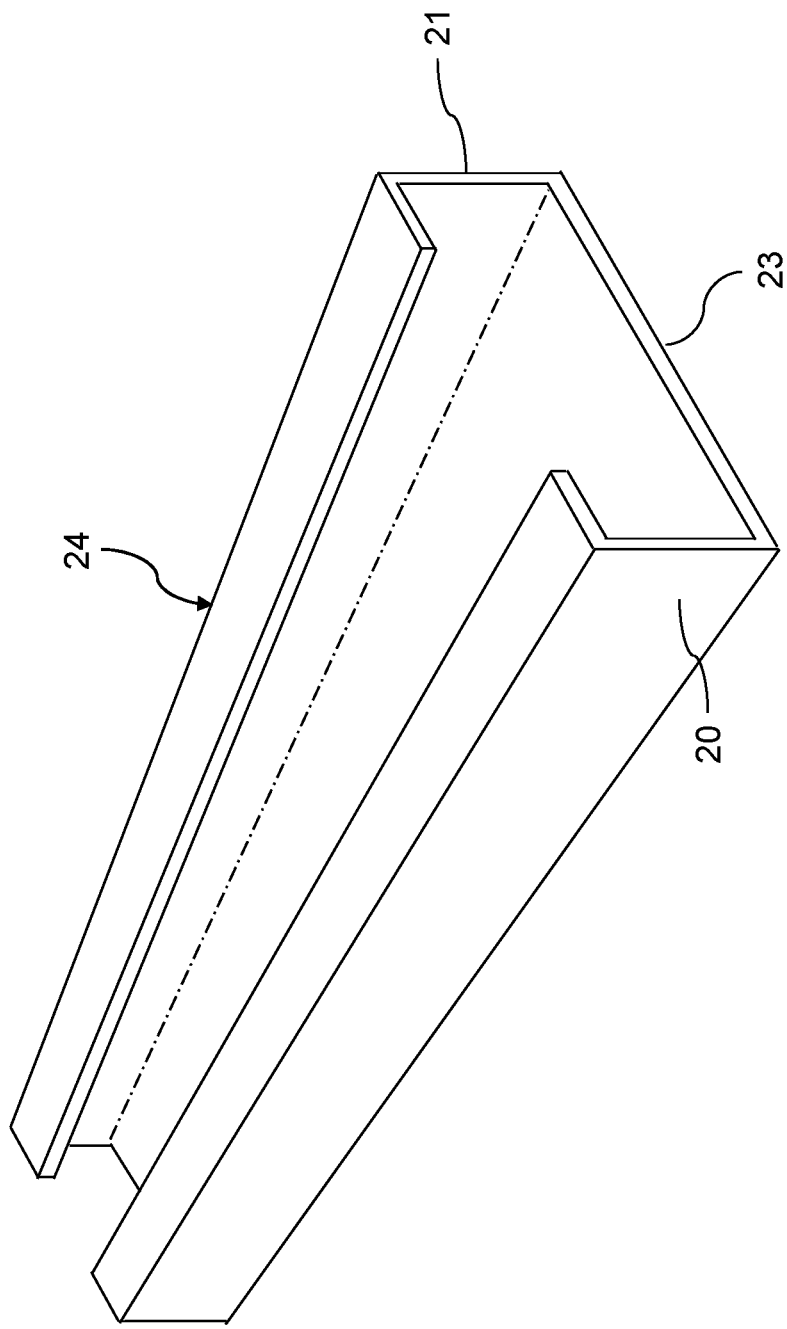
FIG. 7 is an oblique perspective view showing an example of structures of a skin panel and spars which compose a wing structure of an aircraft.

FIG. 7 is an oblique perspective view showing an example of structures of a skin panel and spars which compose a wing structure of an aircraft.

A wing structure body of an aircraft has a structure in which a front spar and a rear spar are disposed on a skin panel. Accordingly, a skin panel, a front spar, and a rear spar are produced respectively so that they can be assembled with fasteners or the like in many cases conventionally. Alternatively, a laminated body of prepregs for a skin panel, a laminated body of prepregs for a front spar and a laminated body of prepregs for a rear spar are produced respectively. After that, they are co-cured in the assembled states. In such a way, a wing structure body can also be produced.

On the other hand, the composite material forming jig 1 exemplified in FIG. 1 to FIG. 4 allows production of a box structural object 24, of which a cross section is generally C-shaped, having a front spar 20, a rear spar 21 and a skin panel 23 on which the front spar 20 and the rear spar 21 have been formed at the both ends as shown in FIG. 7. The typical box structural object 24 composing a main wing or a tailplane is an elongated structural object which becomes thinner toward a wing top. Accordingly, not only an elongated structural object of which cross section has a constant form, but also an elongated structural object, such as the box structural object 24 shown in FIG. 7, of which a shape of cross section changes can be produced by the composite material forming jig 1.

Figure 8:
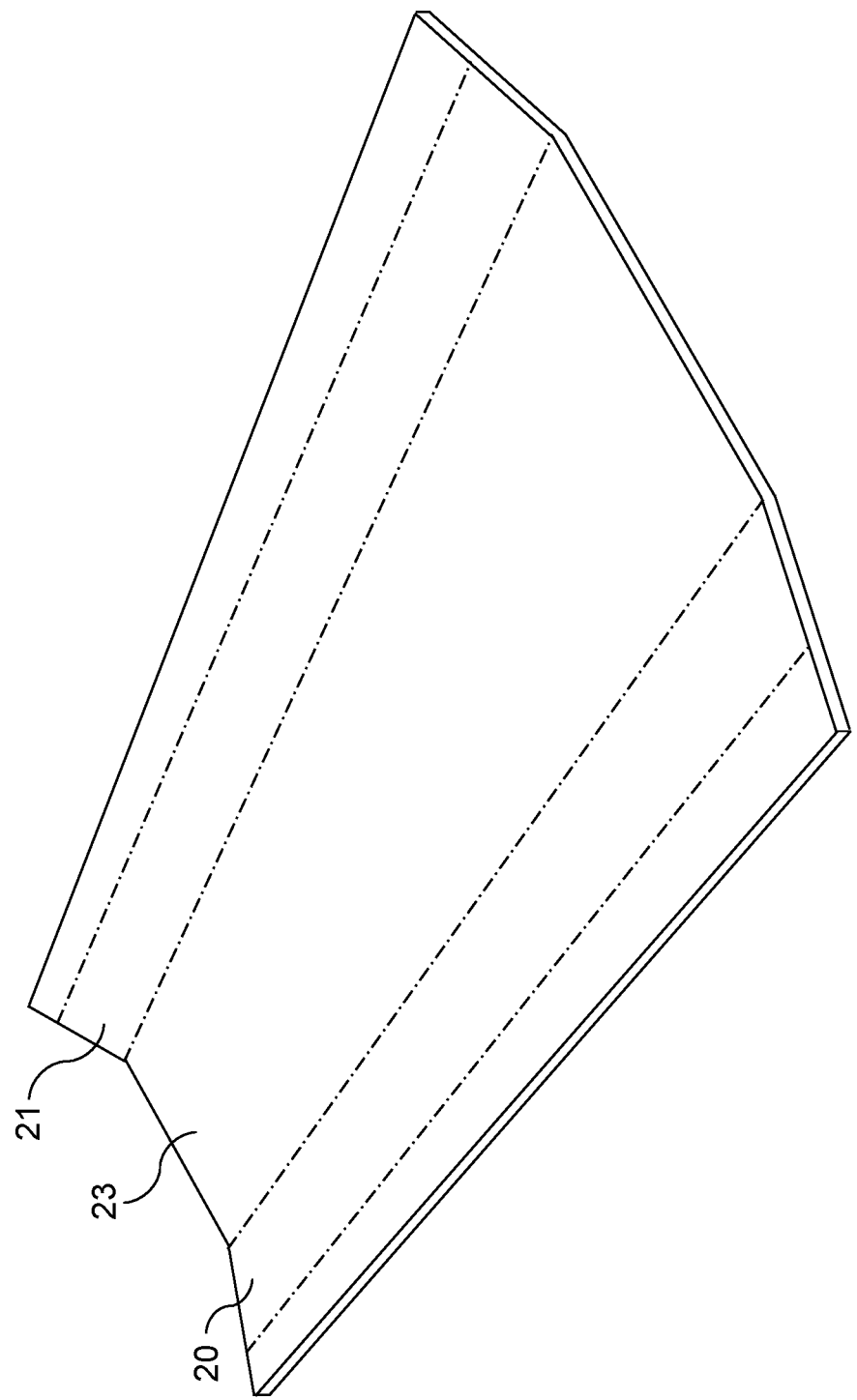
FIG. 8 is an oblique perspective view showing a state where the box structural object 24 shown in FIG. 7 has been developed.

FIG. 8 is an oblique perspective view showing a state where the box structural object 24 shown in FIG. 7 has been developed.

The box structural object 24 shown in FIG. 7 has a structure which can be developed into a plane as shown in FIG. 8 although the cross section is not constant. Specifically, the box structural object 24 becomes a flat part when the front spar 20 and the rear spar 21 are developed. Thus, a plurality of the molds 3 can be disposed in the developed state according to a shape of the developed box structural object 24. Then, sheet like prepregs or fibers can be laminated on the molds 3 in the developed state by the automatic laminating device 2 or manually.

The box structural object 24 shown in FIG. 7 has a structure derived by bending a laminated body of fiber reinforced resin layers at four places in the same direction. Specifically, each of the front spar 20 and the rear spar 21 is a platy composite material bent at one place, and the front spar 20 and the rear spar 21 themselves are formed by bending them from the platy skin panel 23 respectively.

Therefore, the composite material forming jig 1 can be composed of four molds 3, consisting of the mold 3A, the mold 3B, the mold 3C and the mold 3D for the front spar 20 and the rear spar 21, and one mold 3 consisting of the mold 3E for the skin panel 23 as shown in FIG. 1 to FIG. 4. At the time of laminating sheet like prepregs or fibers, the four molds 3 consisting of the mold 3A, the mold 3B, the mold 3C and the mold 3D for the front spar 20 and the rear spar 21 can be developed so that the mold 3A, the mold 3B, the mold 3C, the mold 3D and the mold 3E can be disposed nearly flatly.

A shape of the skin panel 23 composing the box structural object 24 is not rectangular, but is nearly trapezoidal. Accordingly, a shape of a surface of the mold 3E for the skin panel 23 is also approximately trapezoidal. Therefore, the top view of whole of the mold 3A, the mold 3B and the mold 3C, the mold 3D and the mold 3E which have been developed is not always rectangular. Specifically, a surface shape of each mold 3 is determined according to a shape of a composite material before development. Therefore, if a shape of the skin panel 23 is rectangular, a surface shape of the mold 3E for the skin panel 23 is also rectangular.

Meanwhile, the four molds 3 consisting of the mold 3A, the mold 3B, the mold 3C and the mold 3D for the front spar 20 and the rear spar 21 can be inclined inside to the adjacent molds 3 respectively during shaping and thermal curing of a laminated body of fiber reinforced resin layers. More specifically, the mold 3A for the front spar 20 in the end side can be inclined by approximately 90° to the mold 3B for the front spar 20 in the skin panel 23 side while the mold 3B for the front spar 20 in the skin panel 23 side can be inclined by approximately 90° to the mold 3E for the skin panel 23. Similarly, the mold 3C for the rear spar 21 in the end side can be inclined by approximately 90° to the mold 3D for the rear spar 21 in the skin panel 23 side while the mold 3D for the rear spar 21 in the skin panel 23 side can be inclined by approximately 90° to the mold 3E for the skin panel 23. Thereby, a shaping jig having a structure corresponding to the box structural object 24 of which a cross section is nearly C-shaped can be assembled.

When there is at least one corner like the box structural object 24, chamfering, such as R-chamfering or C-chamfering, is often applied to the corner. Thus, a chamfering mold 30 can be assembled in each of spaces among the mold 3A, the mold 3B, the mold 3C, the mold 3D and the mold 3E arisen by inclining the four molds 3 consisting of the mold 3A, the mold 3B, the mold 3C and the mold 3D for the front spar 20 and the rear spar 21 inside to the adjacent molds 3 respectively as shown in FIG. 3 and FIG. 4.

This is similar to a case where a composite material has to be chamfered as well as the box structural object 24 as shown in FIG. 7. Specifically, in a state that at least one of the molds 3 is inclined for shaping laminated fiber sheets impregnated with a resin, the additional mold 30 for chamfering the laminated fiber sheets can be disposed in a space between the at least one inclined mold 3 and the mold 3 adjacent to the at least one inclined mold 3.

In the example shown in FIG. 3, the four molds 30 for round chamfering have been disposed in order to shape a round chamfer on each mountain side of a laminated body of fiber reinforced resin layers which has been bent at four places. Specifically, the mold 30 for round chamfering is disposed in each of a space formed between the mold 3A for the front spar 20 in the end side and the mold 3B for the front spar 20 in the skin panel 23 side, a space formed between the mold 3B for the front spar 20 in the skin panel 23 side and the mold 3E for the skin panel 23, a space formed between the mold 3C for the rear spar 21 in the end side and the mold 3D for the rear spar 21 in the skin panel 23 side and a space formed between the mold 3D for the rear spar 21 in the skin panel 23 side and the mold 3E for the skin panel 23. Each chamfering mold 30 can be coupled to the adjacent mold 3 with bolts or the like.

When the chamfering mold 30 is disposed, it is necessary to prevent interference of the chamfering mold 30 with the tilting structures 4, such as the hinges 4A. Thus, the tilting structure 4 can be composed of the hinge 4A consisting of the two platy parts 10 and 11 coupled to each other by the rotating shaft 12 and disposed so that the thickness directions of the platy parts 10 and 11 become nearly a rotary axis direction. Thereby, the tilting structure 4 can be disposed at a position where interference with the chamfering mold 30 can be avoided.

That is, the hinges 4A can be attached not in a space between the two adjacent molds 3, for disposing the chamfering mold 30, but on the side surfaces of the two adjacent molds 3. Thereby, the chamfering mold 30 can be disposed between the two adjacent molds 3 in the state that the two adjacent molds 3 have been rotatably coupled to each other by the hinges 4A.

On the contrary, when the chamfering mold 30 is not disposed between the two adjacent molds 3, the two adjacent molds 3 may be rotatably coupled to each other with a desired type of hinge, such as a typical flat hinge. A flat hinge has two platy parts of which verges are coupled to each other with a rotating shaft whose length direction is nearly perpendicular to the thickness directions of the two platy parts.

A laminated body of prepregs set on the mold 3A, the mold 3B, the mold 3C, the mold 3D, and the mold 3E which have been assembled is bagged with vacuuming before thermal curing. When a composite material is molded by the VaRTM method, bagging is performed with vacuuming in order to impregnate fiber sheets, laminated on the mold 3A, the mold 3B, the mold 3C, the mold 3D and the mold 3E which have been assembled, with a resin. That is, bagging is performed in advance of the impregnation of a resin in a case of the VaRTM method.

The bagging can be performed by covering a laminated body of prepregs or fibers with a bagging film 31, pasting the end parts of the bagging film 31 on the respective surfaces of the mold 3A, the mold 3B, the mold 3C, the mold 3D, and the mold 3E with a sealant 32, and decompressing an area covered with the bagging film 31 using a vacuum pump 33.

Therefore, it is necessary to prevent any air inflow to an area covered with the bagging film 31. Thus, it is desirable to seal between the chamfering mold 30 and each of the mold 3A, the mold 3B, the mold 3C, the mold 3D and the mold 3E with seal members 34. As a practical example, a groove can be formed on at least one of the chamfering mold 30 and each of the mold 3A, the mold 3B, the mold 3C, the mold 3D and the mold 3E. Then, a packing 34A made of a rubber can be inserted into the groove. Thereby, sealing can be applied between the chamfering mold 30 and each of the mold 3A, the mold 3B, the mold 3C, the mold 3D and the mold 3E.

The same is true independently of the number of the chamfering molds 30. Specifically, in a case of disposing the chamfering mold 30 between the adjacent molds 3, it is desirable to seal, with the seal members 34 including sealants respectively, between the chamfering mold 30 and at least one mold 30 to be inclined, and between the chamfering mold 30 and the other mold 3 adjacent to the mold 30 to be inclined. Thereby, in the state of inclining at least one of the molds 3, an air inflow to an area enclosed by the respective molds 3 and the bagging film 31 covering laminated fibers can be prevented, and the area can be made to become a vacuum state promptly.

Figure 9:
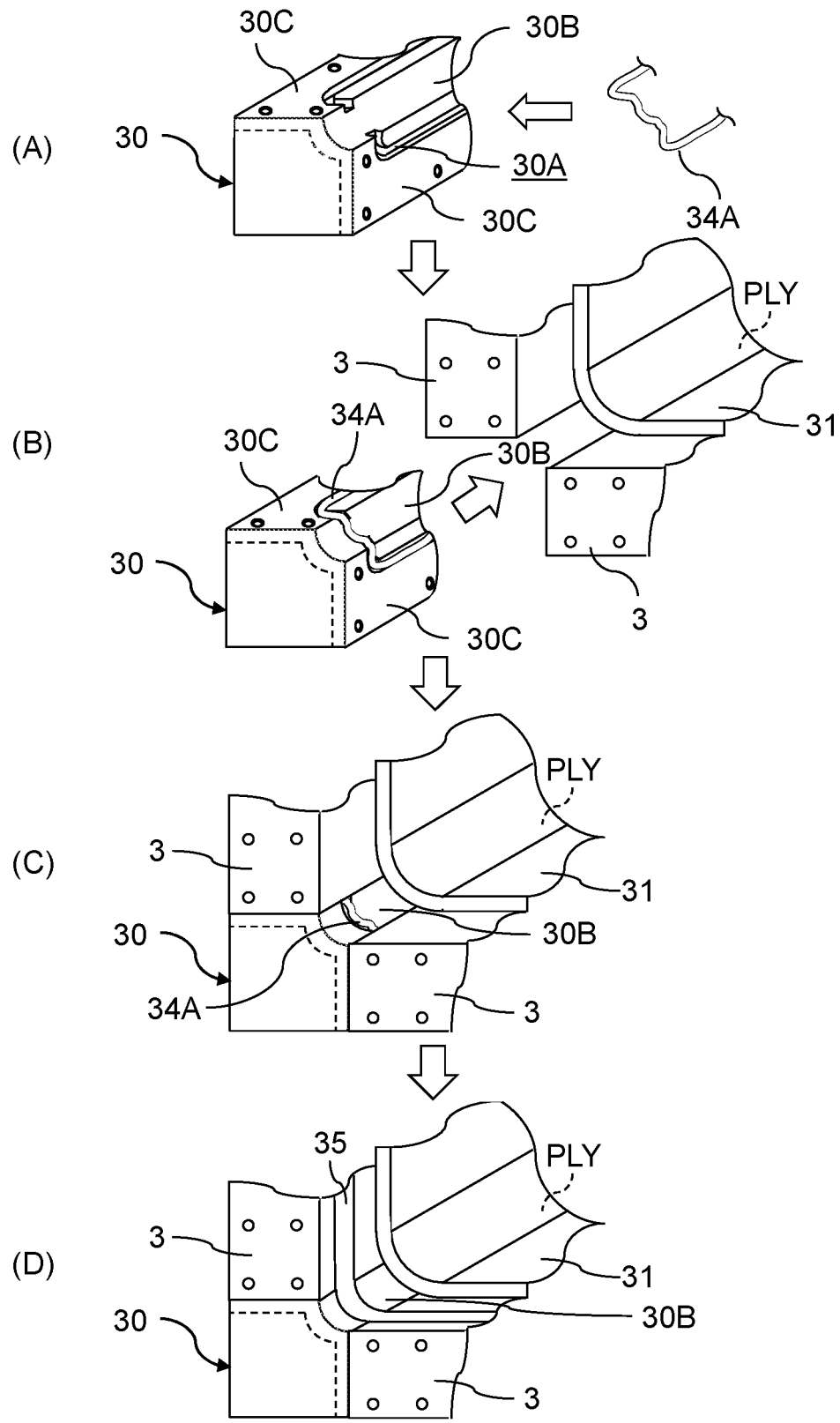
FIG. 9 is a view for explaining a method of forming grooves, on the round chamfering mold shown in FIG. 3, for sealing with a packing.

FIG. 9 is a view for explaining a method of forming grooves 30A, on the round chamfering mold 30 shown in FIG. 3, for sealing with a packing 34A. Note that, drawing the hinge 4A is omitted in FIG. 9.

As shown by (A) in FIG. 9, a structure of the mold 30 for round chamfering may be a hollow box structure having a curved surface 30B and two flat surfaces 30C which sandwich the curved surface 30B. The curved surface 30B of the mold 30 for round chamfering is a surface for shaping a round chamfer. Meanwhile, the two flat surfaces 30C which sandwich the curved surface 30B are contacted with end faces of the two molds 3 in order to fix the mold 30.

On the round chamfering mold 30 which has such a structure, the grooves 30A can be formed for inserting the packing 34A made of a rubber. The grooves 30A are formed on respective surfaces to be sealed of the mold 30 for round chamfering. Therefore, the grooves 30A are respectively formed on the two flat surfaces 30C of the round chamfering mold 30 which contact with two end faces of the two molds 3.

In order to reduce an inflow of air into a bagged area, it is important to make the shape of the packing 34A, to be inserted in the grooves 30A formed on the round chamfering mold 30, into a ring shape. That is, it is important not to form an end face in the packing 34A. Thus, end parts of the grooves 30A formed on the two flat surfaces 30C of the mold 30 for round chamfering can be disposed oppositely to each other at positions sandwiching the curved surface 30B for round chamfering as exemplified by (A) in FIG. 9 so that the ring-shaped packing 34A can be inserted.

Thereby, the mold 30 for round chamfering can be disposed in a space formed between the two molds 3 in a state that the ring-shaped packing 34A has been inserted in the grooves 30A of the round chamfering mold 30 as shown by (B) in FIG. 9.

When the round chamfering mold 30 is brought into contact with the end faces of the two molds 3 and fixed on them with bolts or the like, the curved surface 30B for round chamfering is exposed between the two shaping faces of the molds 3, as shown by (C) in FIG. 9. Therefore, a part of the packing 34A along the curved surface 30B for round chamfering is exposed in the bagging film 31 side.

Thus, in order to prevent an inflow of air from the exposed part of the packing 34A into the bagged area, it is desirable to seal the exposed part of the packing 34A and the end part of the bagging film 31 with the seal tape 35 as shown by (D) in FIG. 9. Thereby, a pressure in the area covered with the bagging film 31 can be made low, and a differential pressure from the atmospheric pressure can be applied on a laminated body of fiber reinforced resin layers. Moreover, when a composite material is molded by the VaRTM method, a differential pressure between a pressure in the area covered with the bagging film 31 and the atmospheric pressure can be applied on a laminated body of fiber sheets before impregnating with a resin.

Note that, prepregs themselves have adhesibility. Therefore, in a case that an object to be bagged is a laminated body of prepregs, the laminated body of the prepregs does not slacken and fall even when the laminated body of the prepregs is disposed below the assembled molds 3.

On the other hand, when an object to be bagged is a laminated body of fiber sheets before impregnating with a resin, it is necessary to prevent the fibers disposed below the assembled molds 3 from slackening or falling, because of the action of gravity, before bagging. Thus, when an object to be bagged is a laminated body of fiber sheets before impregnating with a resin, it is appropriate to fix the fiber sheets with a binder. Thereby, a laminated body of fibers can be stuck on the molds 3. That is, the end parts of the fiber sheets can be prevented from falling due to the gravity before bagging.

In order to produce a composite material with high-quality, it is also important not to generate wrinkles on fiber reinforced resin layers before curing. When the number of fiber reinforced resin layers is comparatively small and the thickness of the laminated body of the fiber reinforced resin layers is thin, the possibility that wrinkles arise is small even when the laminated body of the fiber reinforced resin layers is bent by the inclination of the mold 3. Therefore, after laminating prepregs or fiber sheets on the molds 3 in the developed state, a laminated body of fiber reinforced resin layers without wrinkles can be easily shaped by inclining the at least one targeted mold 3 with the tilting structure 4, such as the hinges 4A.

On the other hand, when a laminated body of prepregs or fibers is bent in a case that the lamination number of the fiber reinforced resin layers is comparatively large and the thickness of the laminated body of the fiber reinforced resin layers is thick, a non-negligible difference arises between the length in the mountain fold side and the length in the valley fold side in each bent part of the laminated body. As a result, wrinkles arise on the bent prepreg sheets or fiber sheets.

Thus, moving structures 40, which respectively change the gaps between the molds 3 in the developed state, and a controlling device 41 of the moving structures 40 can be included in the composite material forming jig 1 so that a high-quality composite material can be produced without generating wrinkles on prepreg sheets or fiber sheets even when a thickness of a laminated body of fiber reinforced resin layers is thick.

In the example shown in the figures, each of the mold 3A, the mold 3B, the mold 3C, the mold 3D, and the mold 3E in the developed state has a hollow box structure of which under surface side is not closed to be an opening so that the moving structure 40 can be attached to each of the mold 3A, the mold 3B, the mold 3C, the mold 3D, and the mold 3E. Then, a pair of ball screws 40A are used as the moving structure 40 for adjusting each gap between the mold 3A, the mold 3B, the mold 3C, the mold 3D and the mold 3E. In other words, the two adjacent molds 3 are coupled to each other with the ball screws 40A.

More specifically, a pair of motors 40B are fixed inside one of the two adjacent molds 3. The output shafts of the motors 40B are respectively integrated with the ball screws 40A each penetrating through the both of the two molds 3. The ball screws 40A are fastened respectively by nuts 40C each fixed inside the other of the two adjacent molds 3.

Therefore, when the ball screws 40A are rotated by power of the motors 40B, the nuts 40C can be moved in parallel in the length direction of the ball screws 40A. As a result, the mold 3 which fixes the nuts 40C can be also moved in parallel in the length direction of the ball screws 40A. That is, the width of the gap between the molds 3 can be adjusted by rotary drive of the ball screws 40A. Therefore, each of the ball screws 40A is disposed so that the length direction may be the adjustment direction of the gap between the molds 3.

In the example shown in the figures, each of the mold 3A, the mold 3B, the mold 3C and the mold 3D for the front spar 20 and the rear spar 21 is placed on a traveling structure 42, such as a dolly having wheels. Meanwhile, the mold 3E for the skin panel 23 is placed on a base 43 without a traveling function. Accordingly, the mold 3A, the mold 3B, the mold 3C and the mold 3D for the front spar 20 and the rear spar 21 can be moved in parallel relatively to the mold 3E for the skin panel 23 by rotary drives of the respective pairs of the ball screws 40A.

Note that, the mold 3A and the mold 3B for the front spar 20 may be coupled to the mold 3E for the skin panel 23 with common ball screws so that the mold 3A and the mold 3B for the front spar 20 can be moved in parallel relatively to the mold 3E for the skin panel 23 by a same distance by rotating the common ball screws. Similarly, the mold 3C and the mold 3D for the rear spar 21 may be coupled to the mold 3E for the skin panel 23 with common ball screws so that the mold 3C and the mold 3D for the rear spar 21 can be moved in parallel relatively to the mold 3E for the skin panel 23 by a same distance by rotating the common ball screws.

Figure 10:
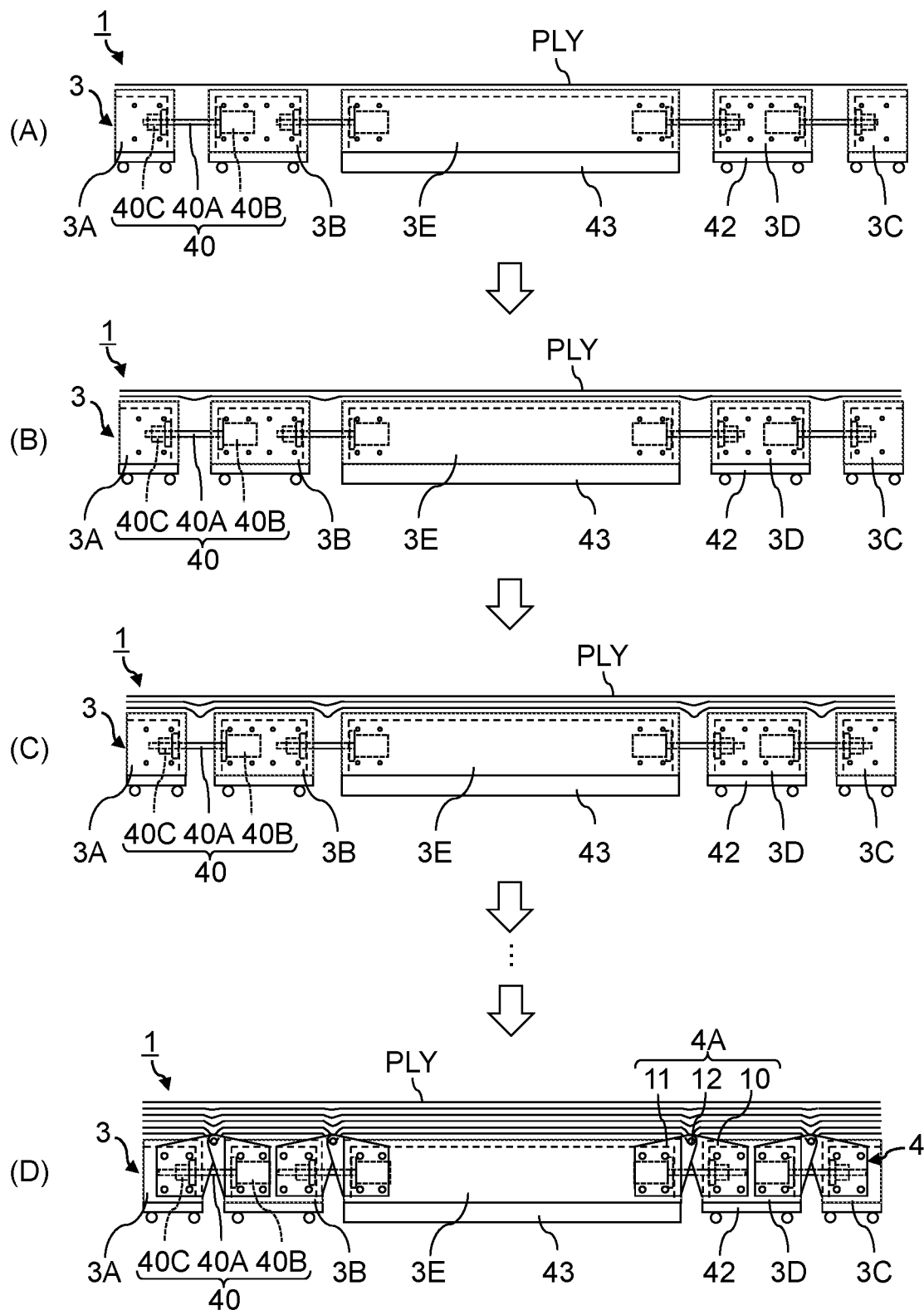
FIG. 10 describes a method of adjusting respective gaps between the molds by the moving structure shown in FIG. 1.

FIG. 10 describes a method of adjusting respective gaps between the mold 3A, the mold 3B, the mold 3C, the mold 3D and the mold 3E by the moving structure 40 shown in FIG. 1.

When the respective gaps between the molds 3 can be adjusted by the moving structures 40, such as the ball screws 40A, the gaps between the molds 3 at the start of laminating prepregs or fiber sheets can be longer than the gaps between the molds 3 at the time of assembling the molds 3 respectively. Then, each gap between the molds 3 can be narrowed gradually by driving the moving structures 40 as the lamination number of the prepregs or fiber sheets increases so that a length in the mountain side of the laminated prepregs or fiber sheets bent by inclining each mold 3 to be inclined may become longer than the length in the valley side of the laminated prepregs or fiber sheets.

More specifically, at the start of laminating the sheet like prepregs or fiber sheets, each gap between the molds 3 can be adjusted to a length in the mountain side of a round chamfer, as shown by (A) in FIG. 10. After that, the gaps between the molds 3 can be narrowed as the lamination number of the prepregs or fiber sheets increases, as shown by (B) and (C) in FIG. 10. In this case, the prepregs or fiber sheets are laminated in a state where the lower prepreg or fiber sheet slackens more between the molds 3. When the last prepreg or fiber sheet is laminated, each gap between the molds 3 is adjusted to a length in the valley side of the round chamfer, as shown by (D) in FIG. 10. Note that, in FIG. 10, the thickness of the laminated body of the prepregs or fiber sheets is illustrated to be thicker than the actual thickness, for convenience of explanation.

When the lengths of the prepregs or fiber sheets are adjusted in such a way, the length, between the adjacent molds 3, of the prepreg or fiber sheet in the lowest layer, laminated at a position nearest to the molds 3 side, becomes the length in the mountain side of the round chamfer. Meanwhile, the length, between the adjacent molds 3, of the prepreg or fiber sheet in the highest layer, laminated at a position farthest from the molds 3 side, becomes the length in the valley side of the round chamfer. Therefore, when the laminated body of the prepregs or fiber sheets is bent by inclining the molds 3, shapes of the round chamfers can be formed without generating wrinkles.

Accordingly, a composite material structure, such as the box structural object 24 in which the front spar 20 and the rear spar 21 are formed on the both end sides of the skin panel 23 as exemplified in FIG. 7, having a shape of a bent plate can be integrally molded in a state where a round chamfer is applied with each corner with high quality.

When at least one gap between the molds 3 is changed, at least one of the molds 3 is inclined by the tilting structure 4 in a state that the changed gap between the molds 3 becomes the narrowest. Therefore, the tilting structure 4, such as the hinges 4A, is required to be attachable to and detachable from the mold 3 to be inclined and the mold 3 adjacent to the mold 3 to be inclined, with bolts or the like, depending on a structure of the tilting structure 4. Accordingly, as shown by (D) in FIG. 10, the hinges 4A are attached to the molds 3 with bolts or the like after the last prepreg or fiber sheet has been laminated.

On the other hand, it is also required for the moving structures 40, such as the ball screws 40A, to be attachable to and detachable from the molds 3, depending on a structure of the moving structures 40, so that the molds 3 after adjusting the gaps can be assembled with necessary inclination. Accordingly, in the example shown in FIG. 3 and FIG. 4, the moving structures 40 including the ball screws 40A have been removed from the molds 3.

The moving structure 40 of the mold 3 may be composed of not only the ball screw 40A but also a linear moving structure, such as a rack and pinion, a hydraulic cylinder or an air cylinder, or a traveling structure, such as a crawler, having power. That is, the moving structure 40 can be composed of at least one of a ball screw, a gear including a rack and pinion, a cylinder and a crawler, Nevertheless, the positioning accuracy of the mold 3 influences quality of a composite material. Therefore, it is preferable to compose the moving structure 40, for adjusting a gap between the molds 3, using the ball screw 40A of which positioning accuracy is high, from a view point of molding a composite material with high quality.

The controlling device 41 controls the moving structures 40 so that the more the updated lamination number of prepregs, which are fiber sheets impregnated with a resin, or fiber sheets before impregnated with a resin increases during the lamination, the narrower the respective gaps between the molds 3 become. In order to control the gaps between the molds 3 more accurately, it is required to specify the number of all the prepregs or fiber sheets to be laminated. Therefore, the controlling device 41 is adapted to acquire information, showing the number of all the prepregs or fiber sheets to be laminated, from the automatic laminating device 2 which automatically laminates the prepregs or fiber sheets on the molds 3, and control the moving structures 40 respectively based on the required information showing the number of all the prepregs or fiber sheets to be laminated.

More specifically, the controlling device 41 can acquire the information showing the number of all the prepregs or fiber sheets to be laminated, as electric signals, from the automatic laminating device 2. Meanwhile, a relation between the numbers of the laminated prepregs or fiber sheets and lengths of the gaps between the molds 3 can be preset in the controlling device 41. Thus, the controlling device 41 can specify appropriate lengths of the gaps between the molds 3 corresponding to the number of the laminated prepregs or fiber sheets. Thereby, the controlling device 41 can output control signals to the moving structures 40 so that the specified lengths of the gaps may be formed between the molds 3 respectively.

When the moving structure 40 is the ball screw 40A which rotates by the power of the motor 40B as illustrated, the controlling device 41 outputs a control signal for controlling a rotation amount to the motor 40B, as an electric signal. Meanwhile, when the moving structure 40 is composed of a non-electrically-operated device, such as an air cylinder or a hydraulic cylinder, a control signal is output to the moving structure 40, as an air signal or the like according to the configuration of the moving structure 40.

Therefore, the controlling device 41 can be composed of electric circuitry, such as a computer in which program has been installed. Moreover, a signal circuit, such as an air signal circuit or a hydraulic signal circuit, which converts an electric signal into an air signal, a hydraulic signal or the like and outputs the converted signal to the moving structure 40 can be used in order to compose the controlling device 41, as necessary.

(Composite Material Forming Method)

Next, a composite material forming method using the composite material forming jig 1 will be described.

Figure 11:
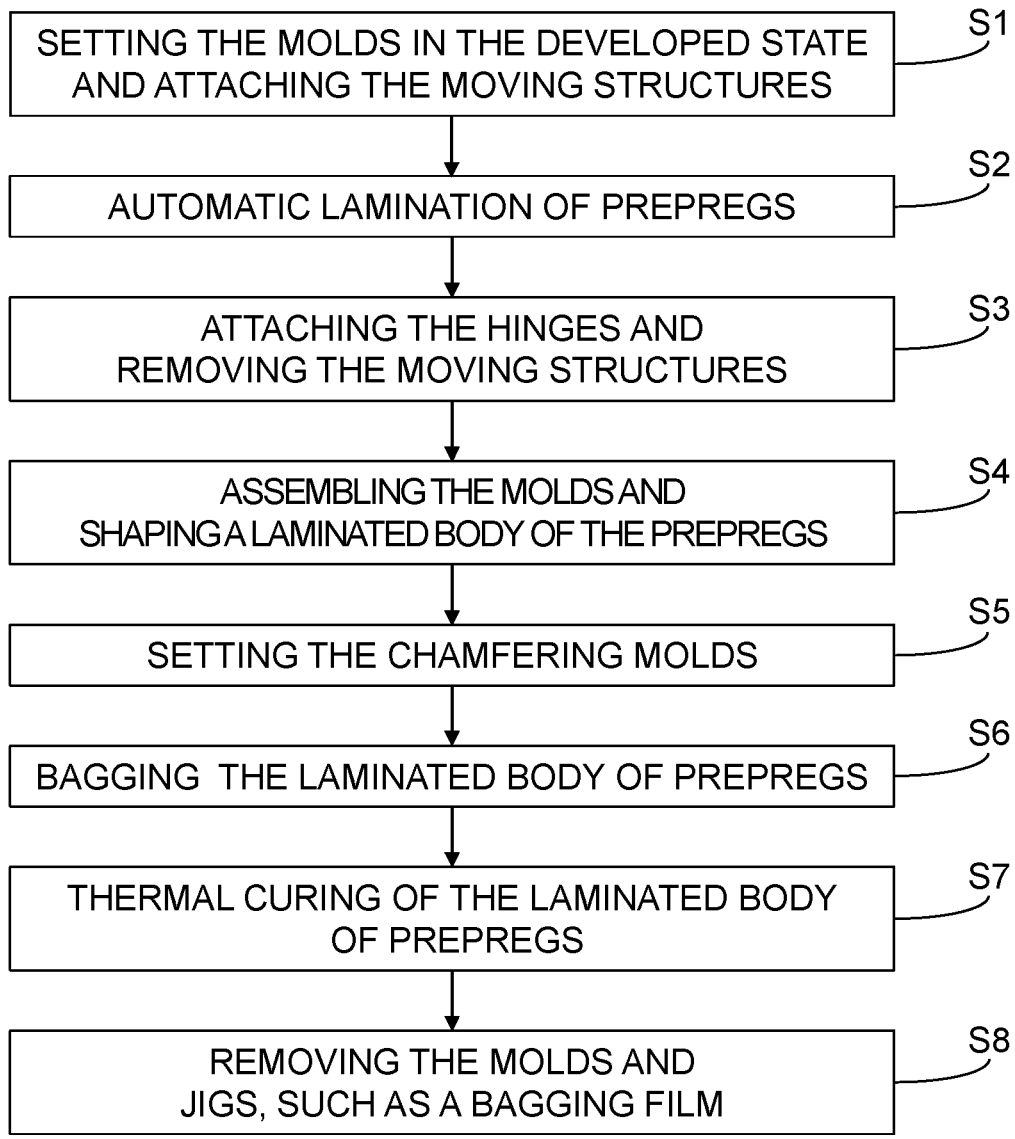
FIG. 11 is a flow chart which shows an example of flow for forming a composite material using the composite material forming jig shown in FIG. 1.

FIG. 11 is a flow chart which shows an example of flow for forming a composite material using the composite material forming jig 1 shown in FIG. 1.

Firstly, in step S1, the molds 3 of which at least one mold 3 can be inclined relatively to at least one other mold 3 are set in the developed state. As a concrete example, as shown by (A) in FIG. 10, the mold 3A, the mold 3B, the mold 3C and the mold 3D for the front spar 20 and the rear spar 21, and the mold 3E for the skin panel 23 are disposed in a lamination area of the automatic laminating device 2, in the developed state. At this time, the hinges 4A constituting the tilting structures 4 are removed from the mold 3A, the mold 3B and the mold 3C, the mold 3D and the mold 3E.

Meanwhile, as shown by (A) in FIG. 10, the moving structures 40 including the ball screws 40A are attached between the mold 3A, the mold 3B, the mold 3C, the mold 3D and the mold 3E. The initial relative positions of the ball screws 40A and the nuts 40C are set to positions where each gap between the mold 3A, the mold 3B, the mold 3C, the mold 3D and the mold 3E becomes a length in the mountain side of a round chamfer.

Next, in step S2, automatic lamination of prepregs is performed. Specifically, the automatic laminating device 2 laminates the prepregs on the mold 3A, the mold 3B, the mold 3C, the mold 3D and the mold 3E in the developed state.

During the lamination of the prepregs, the moving structures 40 drives so that the respective gaps between the mold 3A, the mold 3B, the mold 3C, the mold 3D and the mold 3E may be narrowed gradually as the number of the laminated prepregs increases, as exemplified in FIG. 10. For that purpose, the controlling device 41 acquires the information, which shows the number of all the prepregs to be laminated, from the automatic laminating device 2. Then, the controlling device 41 controls the moving structures 40 based on the acquired information so that the respective gaps between the mold 3A, the mold 3B, the mold 3C, the mold 3D and the mold 3E may be narrowed as the number of the laminated prepregs increases, as shown in by (B) and (C) in FIG. 10, i.e., so that the length in the mountain side of the laminated prepregs bent by inclining the mold 3A, the mold 3B, the mold 3C and the mold 3D may become longer than the length in the valley side of the bent laminated prepregs.

More specifically, the controlling device 41 outputs control values of rotation amounts of the motors 40B, corresponding to control values of the gaps between the mold 3A, the mold 3B, the mold 3C, the mold 3D and the mold 3E, to the motors 40B as control signals respectively. Thereby, the motors 40B rotate and the ball screws 40A have lengths corresponding to the control values of the rotation amounts of the motors 40B respectively. As a result, the gaps between the mold 3A, the mold 3B, the mold 3C, the mold 3D and the mold 3E become gaps corresponding to the control values.

Accordingly, it follows that the prepregs are laminated on the mold 3A, the mold 3B, the mold 3C, the mold 3D and the mold 3E in a state where the nearer to the surfaces of the mold 3A, the mold 3B, the mold 3C, the mold 3D and the mold 3E a prepreg is, the more the prepreg is slackening between the mold 3A, the mold 3B, the mold 3C, the mold 3D and the mold 3E. When the highest prepreg to be laminated lastly is laminated, the gaps between the mold 3A, the mold 3B, the mold 3C, the mold 3D and the mold 3E are each adjusted to become the length in the valley side of the round chamfer. As a result, partial lengths, between the mold 3A, the mold 3B, the mold 3C, the mold 3D and the mold 3E, of the prepreg in the lowest layer, laminated at the position nearest to the mold 3A, the mold 3B, the mold 3C, the mold 3D and the mold 3E, each becomes the length in the mountain side of the round chamfer while partial lengths, between the mold 3A, the mold 3B, the mold 3C, the mold 3D and the mold 3E, of the prepreg in the highest layer, laminated at the position farthest to the mold 3A, the mold 3B, the mold 3C, the mold 3D and the mold 3E each becomes the length in the valley side of the round chamfer.

When the lamination of the prepregs has been completed, the hinges 4A are attached while the moving structures 40 are removed, in step S3. The hinges 4A and the moving structures 40 can be attached to and detached from the mold 3A, the mold 3B, the mold 3C, the mold 3D and the mold 3E, with bolts or the like.

Next, in step S4, the laminated body of the prepregs is shaped by assembling the mold 3A, the mold 3B, the mold 3C, the mold 3D and the mold 3E. Specifically, an operator can hoist the mold 3A, the mold 3B, the mold 3C and the mold 3D to be inclined, using a crane, such as an electric hoist, or a forklift. Thereby, the mold 3A, the mold 3B, the mold 3C and the mold 3D can be inclined around the rotating shafts 12 of the hinges 4A as supporting points respectively. Alternatively, the mold 3A, the mold 3B, the mold 3C and the mold 3D to be inclined may be inclined using a specialized tilting device.

When the mold 3A, the mold 3B, the mold 3C and the mold 3D are inclined relatively to the other adjacent molds 3 respectively as illustrated, a female shaping jig which has a concave surface for shaping the laminated body of the prepregs is formed. Note that, not only the mold 3A, the mold 3B, the mold 3C and the mold 3D as illustrated but also at least two molds 3 out of not less than three molds 3 may be inclined relatively to the other molds 3 so that a female shaping jig which has a concave surface for shaping a laminated body of prepregs can be formed. When the female shaping jig has been formed by assembling the molds 3, the laminated body of the prepregs is shaped according to the shape of the female shaping jig.

Next, in step S5, the chamfering molds 30 are set. Specifically, the chamfering mold 30 is disposed in each space arising between the mold 3 in the inclination state and the mold 3 adjacent to the mold 3 in the inclination state. Thereby, the shaping for chamfering the laminated body of the prepregs can be performed.

Note that, each of the chamfering molds 30 is set in a state that gaps among the chamfering mold 30 and the molds 3 adjacent to the chamfering mold 30 have been sealed with the seal members 34. As a concrete example, the gap between the chamfering mold 30 and each of the mold 3A, the mold 3B, the mold 3C, the mold 3D and the mold 3E is sealed with the packing 34A as exemplified in FIG. 9.

Next, in step S6, the laminated body of the prepregs is bagged. For that purpose, the laminated body of the prepregs is covered by the bagging film 31. The end portions of the bagging film 31 are sealed on the mold 3A, the mold 3B, the mold 3C, the mold 3D and the mold 3E, with the sealant 32. The area covered with the bagging film 31 is connected to the vacuum pump 33 through a vacuum hose. After that, the vacuum pump 33 operates and the area enclosed by the bagging film 31, covering the laminated body of the prepregs, and the set of the mold 3A, the mold 3B, the mold 3C, the mold 3D and the mold 3E becomes a vacuum state.

Thereby, a pressure equivalent to a differential pressure between the atmospheric pressure and a vacuum pressure is applied on the laminated body of the prepregs. That is, the laminated body of the prepregs can be pressurized while the mold 3A, the mold 3B, the mold 3C and the mold 3D to be inclined are kept inclined.

Next, in step S7, the thermal curing under a pressure of the laminated body of the prepregs is performed. Specifically, the bagged laminated body of the prepregs shaped using the mold 3A, the mold 3B, the mold 3C, the mold 3D, and the mold 3E which have been assembled is carried into heating equipment, such as an autoclave molding apparatus or an oven. Then, the laminated body of the prepregs pressurized by the vacuum pressure is heated by the heating equipment. Thereby, the thermosetting resin is cured, and a product or a partially-processed product made of the composite material, consisting of the cured resin reinforced with the fibers, can be produced.

Next, in step S8, the jigs including the mold 3A, the mold 3B, the mold 3C, the mold 3D, the mold 3E and the bagging film 31 are removed. Specifically, the mold 3A, the mold 3B, the mold 3C, the mold 3D and the mold 3E, which have been assembled, in which the product or the partially-processed product made of the composite material after the thermal curing is placed are carried out from the heating equipment.

Then, the mold 3A, the mold 3B, the mold 3C and the mold 3D are lifted by a crane, a forklift or the like so as to be developed around the rotating shafts 12 of the hinges 4A as the supporting points. Alternatively, the mold 3A, the mold 3B, the mold 3C and the mold 3D may be developed using a specialized tilting device. In addition, other jigs, such as the bagging film 31, are also removed from the product or the partially-processed product made of the composite material.

Thereby, the product or the partially-processed product made of the composite material can be taken out. Since the product or the partially-processed product made of the composite material has been produced using the female shaping jig having the shaping concave formed by bending the molds 3, it follows that the product or the partially-processed product made of the composite material has a shape of the laminated body of the fiber reinforced resin layers, consisting of the cured resin reinforced with the fibers, bent at not less than two places. When the mold 3A, the mold 3B, the mold 3C and the mold 3D are bent so that the female shaping jig may be formed as illustrated, the box structural object 24, having the shape of the laminated body of the fiber reinforced resin layers bent at the four places, of which a part of the upper side and the both sides are opened can be produced as exemplified in FIG. 7.

Figure 12:
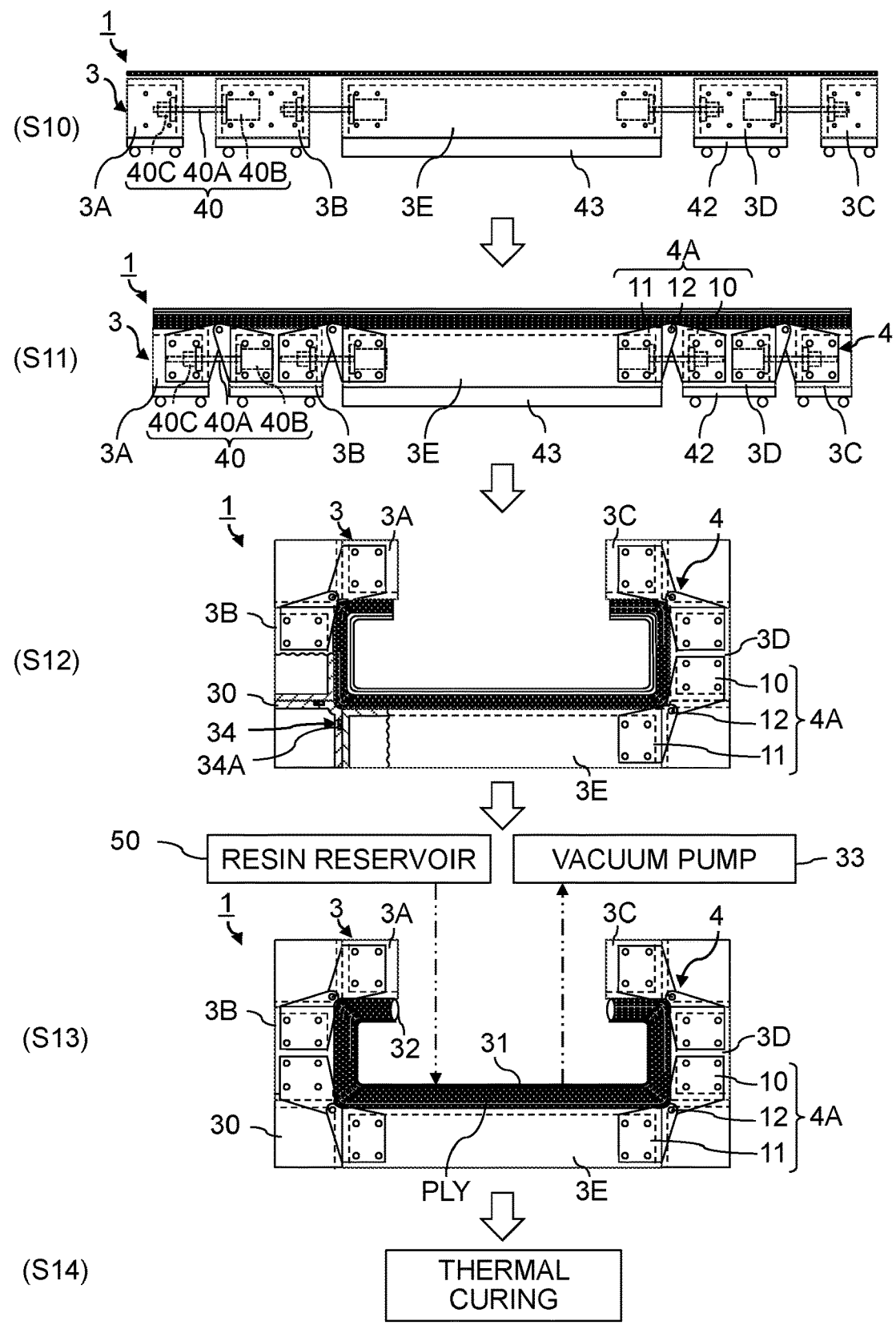
FIG. 12 shows an example of flow in a case of forming a composite material under the hybrid molding method using the composite material forming jig shown in FIG. 1.

FIG. 12 shows an example of flow in a case of forming a composite material under the hybrid molding method using the composite material forming jig 1 shown in FIG. 1.

When a composite material is molded by the hybrid molding method, a predetermined number of prepregs are laminated on the mold 3A, the mold 3B, the mold 3C, the mold 3D and the mold 3E in the developed state, in step S10. While the prepregs are being laminated, the moving structures 40 drives so that the gaps between the mold 3A, the mold 3B, the mold 3C, the mold 3D and the mold 3E may be narrowed gradually as the number of the laminated prepregs increases.

Next, in step S11, fiber sheets which have not yet impregnated with a resin are laminated on the laminated body of the prepregs consisting of the fiber sheets impregnated with a resin. The fiber sheets can be also automatically laminated similarly to the prepregs. As a matter of course, at least one of the prepregs and the fiber sheets may be laminated manually. The moving structure 40 also drives so that the gaps between the mold 3A, the mold 3B, the mold 3C, the mold 3D and the mold 3E may be narrowed gradually as the number of the laminated fiber sheets increases while the fiber sheets are being laminated. When the lamination of the fiber sheets has been completed, the moving structures 40 are removed while the hinges 4A are attached.

Next, in step S12, the mold 3A, the mold 3B, the mold 3C, the mold 3D and the mold 3E are assembled, and subsequently, the chamfering molds 30 are assembled. When the mold 3A, the mold 3B, the mold 3C, the mold 3D and the mold 3E have been assembled, parts of the laminated body placed on the mold 3A for the front spar 20 in the end side and the mold 3C for the rear spar 21 in the end side become under the mold 3A and the mold 3C respectively.

The prepregs are cohesive because of adhesibility of each uncured resin layer. Therefore, the laminated body of the prepregs does not fall off the mold 3A for the front spar 20 in the end side and the mold 3C for the rear spar 21 in the end side, due to their own weights. On the other hand, the fiber sheets before impregnated with a resin are not cohesive. Thus, the fiber sheets are fixed with binder so that end parts of the fiber sheets do not peel and fall off the mold 3A for the front spar 20 in the end side and the mold 3C for the rear spar 21 in the end side. Thereby, the end parts of the fiber sheets can be stuck on the mold 3A for the front spar 20 in the end side and the mold 3C for the rear spar 21 in the end side.

When the assembly of the mold 3A, the mold 3B, the mold 3C, the mold 3D and the mold 3E has been completed, the chamfering molds 30 are assembled. Specifically, the chamfering molds 30 are respectively disposed in the spaces at the four corners formed between the mold 3A, the mold 3B, the mold 3C, the mold 3D and the mold 3E. The gaps between the chamfering molds 30 and the set of the mold 3A, the mold 3B, the mold 3C, the mold 3D and the mold 3E adjacent to the chamfering molds 30 are each sealed with the seal member 34, such as the packing 34A.

Next, in step S13, the laminated body of the prepregs and the fiber sheets before impregnated with a resin is bagged, and subsequently, a resin is injected to the partial laminated body consisting of the fiber sheets. Specifically, the laminated body of the prepregs and the fiber sheets placed on the mold 3A, the mold 3B, the mold 3C, the mold 3D and the mold 3E which have been assembled is covered with the bagging film 31, and the bagging film 31 is stuck with the sealant 32.

An area covered with the bagging film 31 is connected to the vacuum pump 33 through a vacuum hose. Furthermore, the area covered with the bagging film 31 is connected to a resin reservoir 50 through a supply pipe. After that, the vacuum pump 33 operates and the area enclosed by the bagging film 31, which covers the laminated body of the prepregs and the fiber sheets, and the set of the mold 3A, the mold 3B, the mold 3C, the mold 3D and the mold 3E becomes a vacuum state.

Subsequently, a thermosetting resin is injected into the vacuum area, inside the bagging film 31, pressurized by the vacuuming, from the resin reservoir 50 through the supply pipe. Thereby, the fiber sheets can be impregnated with the resin. When the fiber sheets are impregnated with the resin, a laminated body of fiber reinforced resin layers, consisting of the fibers each impregnated with the uncured resin is formed in the vacuum area inside the bagging film 31.

Then, the laminated body of the fiber reinforced resin layers is shaped by the vacuum pressure and the set of the mold 3A, the mold 3B, the mold 3C, the mold 3D, and the mold 3E which have been assembled. Moreover, the four corners of the laminated body of the fiber reinforced resin layers are chamfered into round chamfers or the like by the chamfering molds 30 respectively.

Next, in step S14, the thermal curing of the laminated body of the fibers impregnated with the resin is performed under pressurization. That is, the shaped laminated body of the fiber reinforced resin layers is heated and cured. Thereby, a product or a partially-processed product made of a composite material, having a shape as exemplified in FIG. 7, in which the cured resin has been reinforced with the fibers can be produced.

Note that, a product or a partially-processed product made of a composite material may be produced by only the VaRTM method, besides the method of molding the composite material by the thermal curing of the laminated body of the prepregs as exemplified in FIG. 11 and the method of molding the composite material by the hybrid method as exemplified in FIG. 12. In that case, fiber sheets are laminated on the mold 3A, the mold 3B, the mold 3C, the mold 3D and the mold 3E in the developed state. After that, the bagging and the injection of the resin are performed to the fiber sheets set on the mold 3A, the mold 3B, the mold 3C, the mold 3D, and the mold 3E which have been assembled together with the round chamfering molds 30. Then, the product or the partially-processed product made of the composite material is produced by the thermal curing of the shaped laminated body of the fiber reinforced resin layers produced by injecting the resin.

(Effects)

As described above, the composite material forming jig 1 and the composite material forming method are to laminate prepreg sheets or fiber sheets on the plural molds 3 set in the developed state, and subsequently, to shape an uncured composite material by the molds 3 assembled by inclining at least one of the molds 3.

Therefore, according to the composite material forming jig 1 and the composite material forming method, a composite material, such as the box structural object 24 in which the front spar 20 and the rear spar 21 have been formed on the both end sides of the skin panel 23 as exemplified in FIG. 7, having a complicated shape can be integrally molded. That is, a composite material having a complicated shape can be molded easily, by laminating prepreg sheets or fiber sheets only once, without assembly work of parts. Therefore, when the automatic laminating device 2 is used, working labor required to mold a composite material which has a complicated shape can be reduced dramatically.

Moreover, by adjusting the gaps between the molds 3 with the moving structures 40, such as the ball screws 40A, wrinkles can be prevented from occurring on prepregs or fiber sheets bent by inclining at least one of the molds 3. As a result, even when laminated prepregs or fiber sheets are deformed, quality of a cured composite material can be secured.

(Second Implementation)

Figure 13:
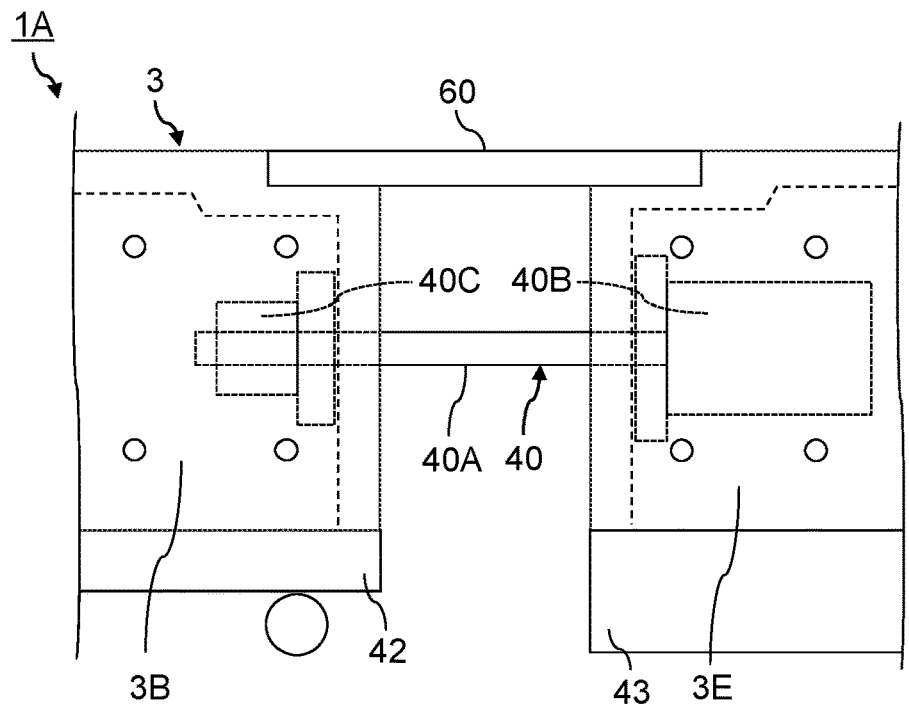
FIG. 13 is a partial enlarged view showing a structure of a composite material forming jig according to the second implementation of the present invention.

FIG. 13 is a partial enlarged view showing a structure of a composite material forming jig according to the second implementation of the present invention.

A composite material forming jig 1A in the second implementation shown in FIG. 13 is different from the composite material forming jig 1 in the first implementation in a structure that the mold 3 to be inclined is coupled to the mold 3 adjacent to the mold 3 to be inclined, with a sheet 6 having flexibility. Since other configurations and actions of the composite material forming jig 1A in the second implementation are not substantially different from those of the composite material forming jig 1 in the first implementation, only a coupled portion with the sheet 60 between the molds 3 is illustrated, and explanation for the same or corresponding elements will be omitted with attaching the same signs.

In the composite material forming jig 1A, the adjacent molds 3 is coupled to each other with the sheet 60 made of silicone or the like having flexibility. As an example, a level difference can be formed in the end part of the surface of each mold 3, and the surfaces of the developed molds 3 can be smoothly coupled to each other by attaching the sheet 60 to the level differences, as shown in FIG. 13. Thereby, at least one of sheet like prepregs and fiber sheets can be laminated on the molds 3 in the developed state.

Figure 14:
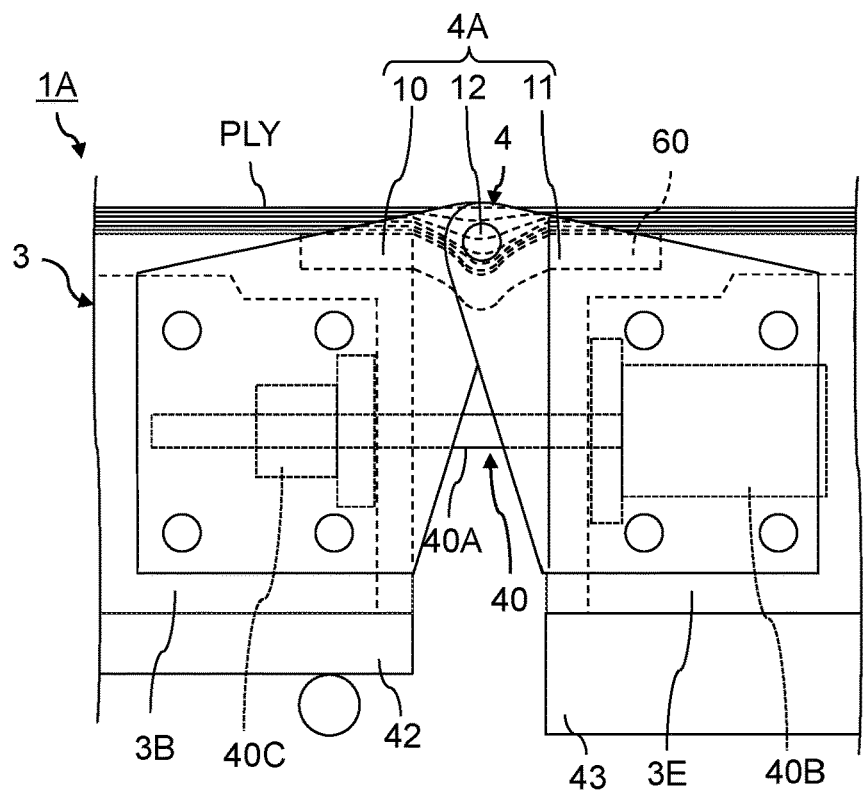
FIG. 14 shows an example of narrowing a gap formed between the molds shown in FIG. 13.

FIG. 14 shows an example of narrowing a gap formed between the molds 3 shown in FIG. 13.

In the second implementation, the gaps between the molds 3 can be also narrowed by the moving structures 40, such as the ball screws 40A, as the number of laminated prepregs or fiber sheets increases, as shown in FIG. 14, like the first implementation. That is, prepregs or fiber sheets closer to the molds 3 can be made slacker according to shapes of round chamfers on a formed composite material. Thereby, the occurrence of wrinkles can be prevented when at least one of the molds 3 is inclined in order to bend the prepregs or the fiber sheets. Then, the hinges 4A can be attached when the gaps between the molds 3 have become lengths corresponding to lengths inside the round chamfers respectively.

Figure 15:
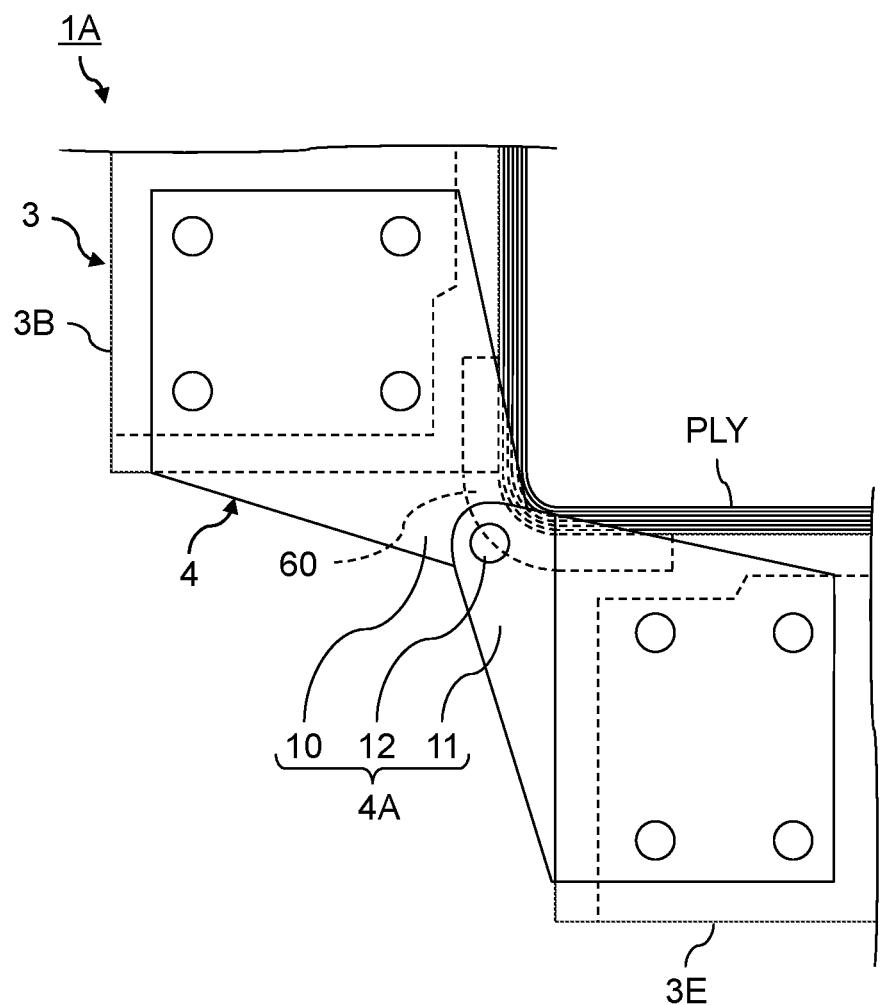
FIG. 15 shows a state where the molds shown in FIG. 14 have been assembled.

FIG. 15 shows a state where the molds 3 shown in FIG. 14 have been assembled.

The moving structures 40 can be removed from the molds 3 whose gaps have been adjusted as shown in FIG. 14 while the hinges 4A can be attached and the molds 3 can be assembled as shown in FIG. 15. Then, each sheet 60 coupling the molds 3 can be bent according to a shape of round chamfer. Thereby, the round chamfering can be applied to the laminated fibers impregnated with the resin in the state where at least one mold 3 to be inclined has been inclined. That is, each edge portion of the laminated body of the fiber reinforced resin layers consisting of the fibers impregnated with the uncured resin can be shaped into the round chamfer.

The above-mentioned composite material forming jig 1A and the composite material forming method in the second implementation is to couple at least two of the molds 3 to each other with the flexible sheet 60 so that round chamfering can be applied to an uncured composite material when at least one of the molds 3 is inclined.

Therefore, according to the composite material forming jig 1A and the composite material forming method in the second implementation, effect that the chamfering molds 30 and the seal members 34 can be unnecessary can be obtained in addition to the effects obtained by the composite material forming jig 1 and the composite material forming method in the first implementation. Consequently, attaching work of the chamfering molds 30 and the seal members 34 can be unnecessary, and a composite material which has a complicated shape can be produced with a simpler work.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A composite material forming method comprising:
    setting molds in a developed state, at least one mold of the molds being capable of being inclined relatively to another mold;
    laminating fiber sheets, after impregnated with a resin, on the molds in the developed state;
    shaping the laminated fiber sheets impregnated with the resin, by relatively inclining the at least one mold; and
    producing a product or a semi-product made of a composite material consisting of the cured resin reinforced with fibers included in the fiber sheets, by thermal curing of the shaped fiber sheets, impregnated with the resin, under a pressure, wherein
    at least one gap between the molds is made narrower as a temporary number of the fiber sheets being laminated increases so that a length in a mountain side of the laminated fiber sheets bent by inclining the at least one mold becomes longer than a length in a valley side of the bent laminated fiber sheets, and
    the at least one mold is relatively inclined by rotating the at least one mold around a rotating shaft by a tilting structure, the tilting structure having the rotating shaft and a part rotating around the rotating shaft, the tilting structure being attachable to and detachable from the at least one mold, the tilting structure being attached to the at least one mold after the at least one gap has been narrowed.

2. The composite material forming method according to claim 1, further comprising:
    chamfering the laminated fiber sheets impregnated with the resin, by disposing a chamfering mold in a space between the at least one mold having been inclined and the mold adjacent to the at least one mold.

3. The composite material forming method according to claim 2, further comprising:
    sealing a first gap between the at least one mold having been inclined and the chamfering mold and a second gap between the mold adjacent to the at least one mold and the chamfering mold, with sealants respectively; and
    applying the pressure on the shaped fiber sheets by forming a vacuum state in an area enclosed by the molds and a bagging film covering the laminated fiber sheets.

4. The composite material forming method according to claim 1, wherein
    a female shaping jig having a concave surface for shaping the laminated fiber sheets is formed by inclining at least two molds out of the molds, composed by not less than three molds, relatively to at least one other mold out of the molds, and
    a product or a semi-product made of a composite material is produced, the composite material being a laminated body of fiber reinforced resin layers bent at not less than two positions, the fiber reinforced resin layers consisting of the cured resin reinforced with fibers included in the fiber sheets.

5. The composite material forming method according to claim 2, wherein
    a female shaping jig having a concave surface for shaping the laminated fiber sheets is formed by inclining at least two molds out of the molds, composed by not less than three molds, relatively to at least one other mold out of the molds, and
    a product or a semi-product made of a composite material is produced, the composite material being a laminated body of fiber reinforced resin layers bent at not less than two positions, the fiber reinforced resin layers consisting of the cured resin reinforced with fibers included in the fiber sheets.

6. The composite material forming method according to claim 3, wherein
    a female shaping jig having a concave surface for shaping the laminated fiber sheets is formed by inclining at least two molds out of the molds, composed by not less than three molds, relatively to at least one other mold out of the molds, and
    a product or a semi-product made of a composite material is produced, the composite material being a laminated body of fiber reinforced resin layers bent at not less than two positions, the fiber reinforced resin layers consisting of the cured resin reinforced with fibers included in the fiber sheets.

7. A composite material forming method comprising:
    setting molds in a developed state, at least one mold of the molds being capable of being inclined relatively to another mold;
    laminating fiber sheets on the molds in the developed state;
    impregnating the laminated fiber sheets with a resin;
    shaping the laminated fiber sheets impregnated with the resign, by relatively inclining the at least one mold; and
    producing a product or a semi-product made of a composite material consisting of the cured resin reinforced with fibers included in the fiber sheets, by thermal curing of the shaped fiber sheets, impregnated with the resin, under a pressure, wherein at least one gap between the molds is made narrower as a temporary number of the fiber sheets being laminated increases so that a length in a mountain side of the laminated fiber sheets bent by inclining the at least one mold becomes longer than a length in a valley side of the bent laminated fiber sheets, and the at least one mold is relatively inclined by rotating the at least one mold around a rotating shaft by a tilting structure, the tilting structure having the rotating shaft and a part rotating around the rotating shaft, the tilting structure being attachable to and detachable from the at least one mold, the tilting structure being attached to the at least one mold after the at least one gap has been narrowed.

* * * * *